(12) United States Patent
Bendel

(10) Patent No.: US 8,589,269 B1
(45) Date of Patent: Nov. 19, 2013

(54) SYSTEM AND METHOD FOR FUNDING COMPANIES

(76) Inventor: Timothy B. Bendel, Chugwater, WY (US)

(*) Notice: Subject to any disclaimer, the term of this patent is extended or adjusted under 35 U.S.C. 154(b) by 686 days.

(21) Appl. No.: 12/785,103

(22) Filed: May 21, 2010

Related U.S. Application Data

(63) Continuation of application No. 12/732,068, filed on Mar. 25, 2010, now abandoned.

(60) Provisional application No. 61/211,284, filed on Mar. 26, 2009.

(51) Int. Cl.
*G06Q 40/00* (2012.01)

(52) U.S. Cl.
USPC .............................................. 705/35; 705/39

(58) Field of Classification Search
USPC .................................................. 705/35, 37
See application file for complete search history.

(56) References Cited

U.S. PATENT DOCUMENTS

| | | | |
|---|---|---|---|
| 5,689,650 | A | 11/1997 | McClelland et al. |
| 5,926,792 | A | 7/1999 | Koppes et al. |
| 6,236,972 | B1 | 5/2001 | Shkedy |
| 6,446,048 | B1 | 9/2002 | Wells et al. |
| 6,879,964 | B2 | 4/2005 | Sauter et al. |
| 7,292,994 | B2 | 11/2007 | Prokoski |
| 7,590,595 | B2 | 9/2009 | Pessin |
| 7,720,749 | B2 | 5/2010 | Sauter et al. |
| 2001/0053988 | A1 | 12/2001 | Park |
| 2002/0156709 | A1* | 10/2002 | Andrus et al. ............... 705/35 |
| 2003/0046207 | A1 | 3/2003 | Torre et al. |
| 2003/0061139 | A1 | 3/2003 | Roberts |
| 2003/0126051 | A1 | 7/2003 | Salim |
| 2004/0098330 | A1 | 5/2004 | Fraivillig et al. |
| 2004/0260643 | A1 | 12/2004 | Glicksman et al. |
| 2005/0192889 | A1 | 9/2005 | Sauter et al. |
| 2006/0112003 | A1 | 5/2006 | Levy et al. |

(Continued)

FOREIGN PATENT DOCUMENTS

| | | |
|---|---|---|
| WO | WO 03/032230 | 4/2003 |

OTHER PUBLICATIONS

Stakeholder perspectives on a financial sector legitimation process: The case of NGOs and the Equator Principles O'Sullivan, N., & O'Dwyer, B. (2009). Stakeholder perspectives on a financial sector legitimation process. Accounting, Auditing & Accountability Journal, 22(4), 553-587, doi:http://dx.doi.org/10.1108/09513570910955443.*

(Continued)

*Primary Examiner* — Olabode Akintola
*Assistant Examiner* — Abhishek Vyas
(74) *Attorney, Agent, or Firm* — Sheridan Ross P.C.

(57) ABSTRACT

A system and method for funding investment seeking companies (ISCs), e.g., startup companies, by a funding company is disclosed. For each of the ISCs, in exchange for private equity therein, the funding company issues a corresponding publicly tradeable class of its own stock substantially based on the performance of the ISC. The ISCs are categorized according to characteristics important to investors, e.g., type of technology, revenue, and products or services (to be) offered so that ISCs in a same category compete against one another for funding distributions from the funding company. In particular, income returns on the investments of proceeds from public sales of each class of stock are periodically distributed among competing ISCs according to, e.g., the share prices of their corresponding class of funding company stocks.

18 Claims, 3 Drawing Sheets

(56) References Cited

U.S. PATENT DOCUMENTS

2006/0259379 A1* 11/2006 Schuchert et al. .............. 705/35
2007/0130042 A1*  6/2007 Dryden ...................... 705/36 R
2008/0077539 A1   3/2008 Drain
2009/0089126 A1   4/2009 Odubiyi

OTHER PUBLICATIONS

Business and financial risks of small farm households in China Turvey, C. G., & Kong, R. (2009). Business and financial risks of small farm households in china. China Agricultural Economic Review, 1(2), 155-172. doi:http://dx.doi.org/10.1108/17561370910927417.*

U.S. Appl. No. 12/732,068, filed Apr. 17, 2003, Bendel.

U.S. Appl. No. 13/366,977, filed Feb. 6, 2012, Bendel.

Official Action for U.S. Appl. No. 12/732,068, mailed Jan. 4, 2012 16 pages.

* cited by examiner (ISC Evaluation)

SYSTEM AND METHOD FOR FUNDING COMPANIES

RELATED APPLICATIONS

The present application is a continuation of pending U.S. patent application Ser. No. 12/732,068 having a filing date of Mar. 25, 2010, which claims the benefit of U.S. Provisional Patent Application No. 61/211,284 having a filing date of Mar. 26, 2009. The entire disclosures of the prior applications hereinabove are incorporated herein fully by reference.

RELATED FIELD OF THE INVENTION

The present disclosure relates to a method and system of funding companies, and particularly, startup companies based on new technologies. The method and system provides computationally tractable techniques for determining the level of funding to be provided to companies that may have little history upon which to base such funding decisions.

BACKGROUND

One of the most critical challenges confronting any start-up business, or a small company seeking to grow larger is adequate financing. Start-up companies, especially including those who have potentially valuable intellectual property or innovative or revolutionary business models, frequently are hampered by the lack of capital necessary to "break out" from an initial research and development mode, and move toward production and commercialization of the new product and/or service.

Start-ups have relatively few options for financing "the next step" in business development. Few, but some, manage to "bootstrap" to the next level, i.e., start out small and try to make a profit, and then reinvest any profits. A significant drawback to this approach is that it is difficult to attain enough income to support salaries for the founding employees.

For centuries, traditional banks have been a potential source of capital for small business. However, a variety of legal and practical constraints often prevent traditional banking institutions from being a lender of first resort for a business start-up.

Occasionally, businesses seeking to start-up, or to shift into a higher level of marketing and commercialization turn to "venture capitalists" as sources of capital—especially small companies with potentially valuable, but also potentially risky, intellectual property. "Venture capitalists" are private investors, typically operating in organized firms, who provide venture capital to promising business ventures. Venture capitalists, however, typically invest only where high (e.g., at least 25 percent) annual returns within one to five years are feasible, and often demand 50 percent or more ownership to exercise control over the investee firm to offset perceived high risk. They may, however, also provide to the funded entity some management and industry expertise, and business connections with other firms and venture capitalists. The objective of venture capitalists usually is to bring the business to its initial public offering (IPO) stage, so that they can sell their shareholdings to the public at high profit, and get out.

But there is a perception among many small company founders that venture capitalists may not be the fastest nor fairest way to grow the business. It can take years to get noticed by influential venture capital firms. And once an investment is obtained, the investors may take up to a 90% share of the company, begin giving orders to the founders/inventors, and then eventually force them out of the enterprise entirely.

Start-up companies which unsuccessfully seek funding from venture capitalists, or which prefer to avoid the venture capitalist route, may turn instead to "angel investors." An angel investor usually is a wealthy former entrepreneur or professional who provides starting or growth capital in promising ventures, and helps also with advice and contacts. Unlike venture capitalists, angel investors usually operate alone (or in very small groups) and play only an indirect role as advisors in the operations of the investee firm. They are deemed to be 'angels' in comparison with venture capitalists who are sometimes derogatorily called "vulture capitalists."

Angel investors are excellent sources of funding for small business start-ups, but even so many start-ups have difficulty attracting angel investor financing. Many of the most desirable angel investors are preoccupied or unavailable as they pursue various interests in a marketplace where the demand for start-up capital substantially exceeds the supply, even for well-qualified potential investees. Since an angel investor must be typically willing to risk a considerable sum on the investment, he/she must be very interested in an early stage company. Further, angel investors must be at least moderately wealthy since each must be an "accredited investor" under the Securities Act of 1933. Moreover, the investee start-up must be prepared to constantly impress an angel investor and stoke his or her interest, for if the angel looses interest in the project, the start-up may lose funding from the angel.

Accordingly, it is difficult to get a start up company to the point of proceeding to an initial public offering (IPO) of stock. Moreover, even if a start-up grows to the point that an IPO is an appropriate next step, Security and Exchange Commission (SEC) reporting requirements are a large, and potentially prohibitively, expensive drain on the start-up.

Significantly, there are a many people of ordinary or relatively modest means who are interested in investing in private start-up companies, including high-tech businesses with tremendous potential, but are prohibited from investing by practical and legal barriers. In particular, for both the small investor and the start-up, the cost of contracts, ownership estimation, and time (e.g., for due diligence endeavors) often do not justify small investments.

It is known to use independent holding companies to permit "small" investors to purchase interests in securities that are already publicly traded. For example, in about 1996 some entrepreneurs managed to buy a few shares of high-priced stock in Berkshire Hathaway, and then formed a holding company. The holding company's intrinsic value was the stock it owned. The holding company then made an IPO, issuing thousands of its own shares (at a relatively affordable price per share). As a result, the average investor could thereby buy an affordably priced stock that was directly correlated to the value of the high-value stock in Berkshire Hathaway.

In certain contexts, a company may take advantage of what is known as an "alternative public offering" process. Two parts comprise an alternative public offering; a reverse merger and a Private Investment of Public Equity (PIPE). In a reverse merger, a previously private company becomes "public" by merging with (or being acquired by) a public company that functions as a legal "shell." The shell company is a public company that initially typically has no assets or liabilities. Upon the merger of these private and public companies, the combined entity thereafter trades under the previously private company's name, rather than the shell company's name.

Distinguishing an alternative public offering from a reverse merger is the execution of a simultaneous "PIPE" raise. A "PIPE" is characterized by a publicly traded company selling its stock to investors in a privately negotiated transaction. The stock is normally sold at a discount to current market value and investors normally acquire unregistered "restricted" stock. The typical PIPE investor is an institutional investor (e.g., large pensions, mutual funds). PIPEs are usually completed by investment banks who act as a "placement agent" in the transaction. Additional basic information about alternative public offerings is available at, for example, www.wikipedia.com.

Notwithstanding the foregoing financing methodologies, an unmet need remains, e.g., for, both angels and "small" investors to find more effective techniques to lawfully invest in start-up companies. In particular, it is desirable for investors be they wealthy, "accredited" or otherwise) to more effectively pool their money, for investing in start-up companies. Moreover, it is desirable for start-up companies to the able to more easily access investors. In particular, start-up companies typically spent too much of their time raising money rather than developing their novel product or service. Accordingly, these and other problems in the prior art are addressed in the disclosure as provided herein below.

SUMMARY

Disclosed herein is an innovative financing method and computational system for financing companies such as start-up companies, and/or any company that has not issued a public offering of stock. The method permits both accredited and non-accredited investors (according to the U.S. Securities and Exchange Commission (SEC)), to participate indirectly in the funding of such companies (each such company referred to herein as an "investment seeking company" or ISC), wherein such ISCs are typically relatively small, privately owned, start-up companies.

The method of the present disclosure features three principal aspects. First, a publicly traded company (referred to herein as a "holding company") is established for providing funding to, e.g., private start-up companies. For each investment seeking company (ISC) that the holding company agrees to fund, the holding company acquires private equity or private stock from the ISC. However, instead of the holding company providing substantial funding directly to such an investment seeking company or swapping holding company equity for equity in the investment seeking company, the holding company uses at least a portion of the acquired investment seeking company's equity as the asset for which the holding company provides services such as:

(i) Issuing a class of stock in the holding company, for purchase by private investors, and/or public investors, wherein the stock is based substantially on the assets and financial achievement of the investment seeking company (such stocks also referred to herein as "ISC stocks"),
(ii) Based on the price of such ISC stocks at various times, the holding company incrementally or periodically providing amounts of funding to the investment seeking company, and in particular, such funding may be based on a fluctuating stock price for the holding company's class of stock that is based on the assets and financial achievement of the investment seeking company as determined over time by inventors in this stock, and
(iii) Under certain circumstances, the holding company will assist the investment seeking company in obtaining additional funding.

Significantly, the holding company's agreement to acquire equity in the investment seeking company is a private direct purchase transaction, and not an initial public offering of the investment seeking company's stock. Moreover, the holding company's equity in the investment seeking company may be in a range of, e.g., about 10% to 12.5%, wherein at least about 8% is used as the equity for the corresponding class of stock to be issued.

To further clarify, in order for the holding company to perform the above recited services for an investment seeking company, and since the holding company is legally authorized to sell public shares its own stock, the holding company issues the additional class of its own stock on a public stock exchange wherein such additional shares are, in one embodiment, directly and legally linked to the business endeavors and assets of the investment seeking company. That is, the additional class of stock may be legally tied solely or substantially to the holding company's assets acquired from the investment seeking company, and accordingly investors purchasing such holding company shares may benefit from the success of the investment seeking company. In particular, for any payouts, stocks swaps, buyout offers or other forms of compensation resulting from the investment seeking company to the holding company, and for which the holding company has sold corresponding shares to investors, such compensation will preferably be passed pro rata directly through to such share holders. Moreover, in one embodiment, the agreement between the holding company and the investment seeking company will stipulate that if the investment seeking company offers an initial public offering (IPO), then both the holding company and the investors having the holding company's stock based on the investment seeking company shall have the option to convert their equity based on the investment seek company into publicly traded shares of the investment seeking company at, e.g., a discounted price, and/or to buy additional shares from the IPO at a discounted price. Thus, the price of such an additional holding company class of stock may be substantially based on investor perceived commercial viability of the investment seeking company instead of the holding company.

It is a further aspect of the presently disclosed financing method and system that such an additional class of issued holding company stock may be offered to investors via, in one embodiment, an auction format. Such an auction format may be any of various auction techniques, including:
(i) A typical auction where investors bid in real time against one another (also known as an English auction or open ascending price auction).
(ii) A buyout auction where there is a set price (the 'buyout' price) that any bidder can accept at any time during the auction, thereby immediately ending the auction and winning the item. If no bidder chooses' to utilize the buyout option before the end of bidding the highest bidder wins and pays their bid.
(iii) A combinatorial auction wherein there is the simultaneous sale of more than one item where bidders can place bids on an "all-or-nothing" basis on "packages" rather than just individual items, i.e., a bidder can specify that he or she will pay for items A and B, but only if he or she gets both. Note, that in such an auction, the holding company may issue the additional holding company stock wherein the underlying assets for the additional shares are solely or substantially based on predetermined plurality of investment seeking companies.
(iv) A no reserve auction, also known as an absolute auction, in which the stock shares for sale will be sold regardless of price.

(v) A reserve auction wherein the stock shares for sale may not be sold if the final bid is not high enough to satisfy the holding company.

However, preferably such auctions are made under an auction direct public offering (DPO) format. For example, the auction may set the share price at the lowest share bid price of the highest 100 bids.

It is a further aspect of the presently disclosed financing method and system that funds transferred into the holding company from investor purchases of such newly issued stock offerings is deposited into an income producing escrow account (e.g., an interest-bearing escrow account) that is used to fund the investment seeking company (or companies) upon which the newly issued stock is based. In particular, the received capital associated with sales of each such particular class of stock may be deposited into a segregated escrow account corresponding to one or more predetermined investment seeking companies for which the capital is intended to fund.

The funding to such an investment seeking company may be provided in increments over time at least partially (if not totally) from interest, dividends or other financial instruments in which the capital from the stock sale is invested by the holding company. In one embodiment, the funding for an investment seeking company may be provided solely from the return on the investment of the escrowed funds from the stock sale associated with the investment seeking company. For example, the investment seeking company may obtain quarterly revenue based on the escrowed amount from the stock sale. In one embodiment, such repeated or periodic infusions of capital into an investment seeking company may be dependent upon a current bid or asked price for the corresponding holding company class of stock associated with the investment seeking company at each time such a capital infusion is to occur. Thus, for example, in one embodiment such an investment seeking company may receive substantially an entire portion of the holding company's investment quarterly return (e.g., interest) on the escrowed funds from the sale of stock associated with the investment seeking company when, at a time for determining such a capital distribution to the investment seeking company, the corresponding stock's bid or ask price is within a relative range and/or a predetermined range based, e.g., on a stock price for the initial offering and/or an increase/decrease therefrom. Thus, the holding company may have sold a class of shares in an initial public offering for an average price of $10 per share (e.g., via auction), wherein the investment seeking company corresponding to this initial public offering receives quarterly capital distributions from the holding company of, e.g., 1.5% of the escrowed stock sale investment when the company meets certain milestones, and/or when the current bid or asked price for the stock on the open market is within a predetermined range, such as, at least the average initial offering price per share plus a 10% annual increase. Alternatively, if the investment seeking company does not meet certain predetermined milestones and/or does not have a current open market bid or asked price above a particular threshold, then a lesser amount is distributed to the investment seeking company. For example, for a milestone not met, each quarterly capital distribution to the investment seeking company may be reduced by 10%, and/or for each percentage of the company's target open market share price (bid or asked) below a particular threshold price, the capital distribution to the investment seeking company may be reduced by that same percentage. Accordingly, since distributions of capital to the investment seeking company are, e.g., periodic, there may be a substantial incentive for the investment seeking company to both timely meet milestones and properly communicate with investors about the achievements of the company.

In one embodiment of the presently disclosed financing method and system, an investment seeking company's capital distributions provided by the holding company may be relative to a performance of milestones and/or share prices of one or more other investment seeking company's funded by holding company public offerings sold by and for the holding company. For example, two or more investment seeking companies (also referred to as "ISCs" herein) may be effectively in competition for periodic distributions of funds from the holding company, wherein, e.g., each investment seeking company may be provided with a holding company distribution based on the relative share prices of the holding company stock corresponding to such companies. In particular, the funding distributions to each of the investment seeking companies, preferably is dependent upon at least one factor that "tracks" the share price movement of the corresponding holding company stock based on equity in the investment seeking company. That is, funding distributions to the investment seeking company preferably is determined using multiplicative factor that increases (decreases) when the share price of the corresponding holding company stock increases (decreases). Moreover, for investment seeking companies in competition with one another for funding distributions, a distribution to a one of the investment seeking companies typically implies a decrease in a funding distribution to another one of the competing investment seeking companies.

It is also within the scope of the present disclosure that only investment seeking companies having related or similar products or services are in competition with one another. For example, investment seeking companies may be categorized according to one or more of: (i) their primary technology area (e.g., aerospace, telecommunications, information technology, pharmaceuticals, mining, etc.), (ii) primary commercial item (e.g., product or service), (iii) target customer base (e.g., mass market, military, government, legal, corporations/businesses, etc.), and/or (iv) any other categorization that may foster appropriate competition among the investment seeking companies. In one embodiment, an investment seeking company (e.g., a startup company) may be compared with other companies in each category that the investment seeking company is classified. For example, a start-up software company for the pharmaceutical industry may be classified in the following categories: information technology, service providing, corporate customer based, and pharmaceutical related. Thus, the start-up company may be ranked against other investment seeking companies in each of these categories, and a resulting composite ranking may be periodically assigned to the start-up based on its ranking in each of its categories. For example, such a composite ranking may be a simple averaging of the start-up company's individual rankings; alternatively, a weighted sum may be used for such a composite ranking, wherein the start-up is assigned a weighting to each of its categories according to how similar the start-up is with other investment seeking companies in the category. Note the ranking may correspond to the funding amounts to be distributed to the investment seeking companies in competition with one another in one or more categories. However, in one embodiment, such ranking may be used to determine funding distributions.

In one embodiment, an investment seeking company may be guaranteed a minimum amount in distributions as long as: (i) certain milestones are met, and/or (ii) their share prices are above a particular price.

In one embodiment, two or more investment seeking companies may be bundled together by the holding company as the underlying asset for a holding company public offering. In such a case, each repeated or periodic capital distribution to each of the bundled companies may be relative to the company's performance relative to the other investment seeking companies in the bundle. Alternatively, in certain embodiments, all investment seeking companies funded by the holding company, regardless of the IPO from which initial funds where raised, may compete against one another for portions of the iterative distributions of, e.g., escrow interest, to be distributed by the holding company.

It is worthwhile to note that subsequent to an initial public offering (e.g., auctioning) of a new class of shares of the holding company (based on the assets of one or more investment seeking companies), investors are typically able to trade in such shares of this new class of stock efficiently and affordably via, e.g., Internet-based vehicles, much like AMERITRADE®, E-TRADE®, and/or an Internet portal of the holding company itself. Moreover, the initial public offering bids and/or purchases may also be provided via the Internet. In one embodiment, investors in various classes of holding company stock may exchange one class of holding company stock for another class of holding company stock, and in particular, such exchanges may be made directly via the holding company rather than through third party entities such as AMERITRADE®, or E-TRADE®. Moreover, in one embodiment, the holding company may offer incentives for trading between various classes of its stock in investment seeking companies by allowing investors to reinvest a portion of their funds put into a failed investment seeking company into another class of holding company stock corresponding to another investment seeking company. For example, since a substantial amount of the initial investor funds raised from holding company shares based on a failed investment seeking company may still remain in escrow, the holding company may allow investors owning current shares of the failed investment seeking company to transfer a corresponding portion of the funds in the escrow account for the failed investment seeking company into shares of another class of stock (e.g., for another investment seeking company) of the holding company. For example, the holding company may allow investors to redeem 5% to 50% of the original share price if the corresponding investment seeking company fails within, e.g., 5 years of the IPO offering of holding company's shares based on the failed investment seeking company. Note that the amount redeemed preferably must be preferably used to purchase shares of another class of holding company stock corresponding to another investment seeking company. Allowing holding company shares corresponding to a failed investment seeking company to be redeemed in this manner may be a significant incentive for investors to invest in the holding company's various classes of stocks. Moreover, since the holding company may charge for exchanges between various classes of its issued stock, if at least some exchanges (e.g., resulting from a failed investment seeking company) must be performed directly through the holding company, such restrictions in exchanges may accustom and/or incentivize investors to contact the holding company directly for all stock exchanges, purchases, and sales rather than use third party entities such as AMERITRADE®, or E-TRADE® and the like.

Accordingly, since the holding company receives equity positions in investment seeking companies, and preferably does not issue corresponding holding company shares on the entire equity position obtained in such companies, in the event that such an investment seeking company becomes successful, the holding company may receive substantial financial compensation from wholly owning private shares of the investment seeking company. Additionally, since the holding company may retain a substantial (if not the entire) amount of investor funds in a class of stock based on the assets of a failed investment seeking company, such additional funds may provide additional revenue for the holding company. Furthermore, the holding company may, as indicated above, charge investors for exchanges between classes of its stock, and thus obtain yet another revenue stream. Thus, it is anticipated that the holding company will increasing become more profitable as larger numbers of investment seeking companies enter into agreements with the holding company to have a corresponding class of holding company public stock issued with such stock based on the assets of the investment seeking companies.

The processes for implementing the above described financing method and system are performed by computational equipment such as specially programmed computers, communication networks (both local networks and wide area networks, e.g., the Internet) as well as websites, secure data storage capabilities and database management systems. In particular, the processes and methods disclosed above can be executed by machine, and in fact efficient performance of the method will rely on software run on a suitable digital computer. Use of one or more computers to perform the method does not preclude, however, the generation and transfer of paper stock certificates as part of the computer based method of the present disclosure.

This Summary section is neither intended nor should be construed as being representative of the full extent and scope of the present invention. Additional benefits, features and embodiments of the present disclosure are set forth in the attached figures and in the description hereinbelow and as embodied by the claims. Accordingly, it should be understood that this Summary section may not contain all of the aspects and embodiments claimed herein.

Additionally, the disclosure herein is not meant to be limiting or restrictive in any manner. Moreover, the present disclosure is intended to provide an understanding to those of ordinary skill in the art of one or more representative embodiments supporting the claims. Thus, it is important that the claims be regarded as having a scope including constructions of various features of the present disclosure insofar as they do not depart from the scope of the methods and apparatuses consistent with the present disclosure (including the originally filed claims). Moreover, the present disclosure is intended to encompass and include obvious improvements and modifications of the present disclosure.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention.

DETAILED DESCRIPTION

Introductory Remarks

Figure 1:
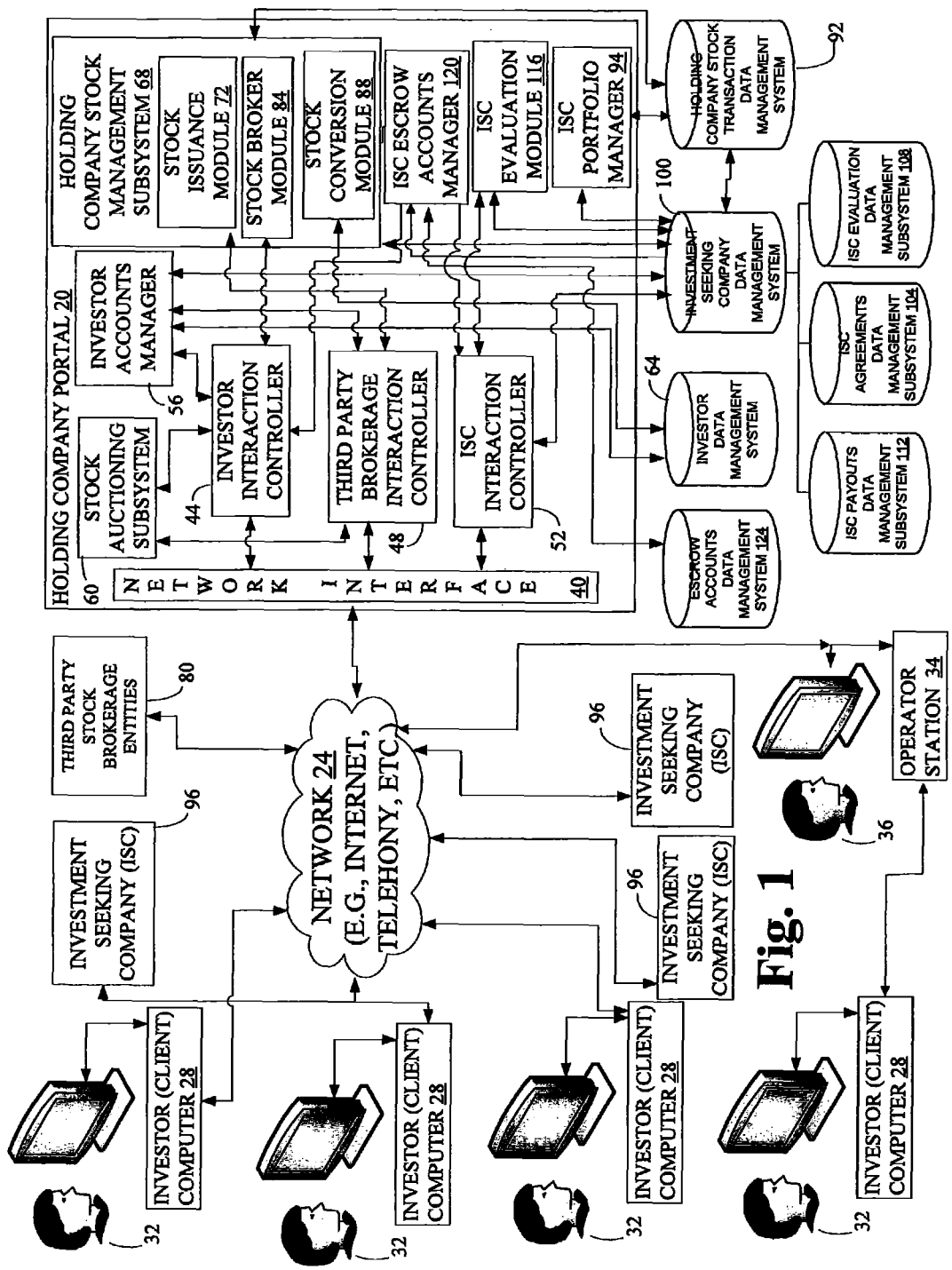
FIG. 1 shows a high level architectural diagram of computational machinery processing components of a network portal for the holding company together with high level data flow arrows between such components and with external network nodes for investors, investment seeking companies (ISCs), and third party brokers.

For the purposes of promoting an understanding of the principles set forth in the present disclosure, reference will now be made to exemplary embodiments. Any alterations and further modifications of the inventive features illustrated herein, and any additional applications of the principles illustrated herein, which would occur to one skilled in the relevant art and having possession of this disclosure, are to be considered within the scope of the invention as described in the claims following this Detailed Description section. The features, functions, and the like described herein are considered to be able to be combined in whole or in part one with another as the claims and/or art may direct, either directly or indirectly, implicitly or explicitly.

Reference throughout this specification to an "embodiment," an "example" or similar language means that a particular feature, structure, characteristic, or combinations thereof described herein may, but do not necessarily, refer to the same embodiment, to different embodiments, or to embodiments disclosed in one or more of the figures.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of programmable or executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module and/or a program of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The various system components and/or modules discussed herein may include one or more of a host server or other computing systems including: (i) a processor for processing digital data; (ii) a memory coupled to the processor for storing digital data; an input digitizer coupled to the processor for inputting digital data; (iii) an application program stored in the memory and accessible by the processor for directing processing of digital data by the processor; (iv) a display device coupled to the processor and memory for displaying information derived from digital data processed by the processor; and (v) a plurality of databases together with their database management systems. As those skilled in the art will appreciate, any computers or computational machinery discussed herein may include an operating system (e.g., Windows 7, Windows Vista, NT, 95/98/2000, OS2; UNIX; Linux; Solaris; MacOS, Snow Leopard; etc.) as well as various conventional support software and drivers typically associated with computers. The computers or computational machinery may be in a home or business environment with access to a network. In an exemplary embodiment, access is through the Internet through a commercially-available web-browser software package.

The present disclosure may be described herein in terms of functional block components, screen shots, user interaction, optional selections, various processing steps, and the like. Each of such described herein may be one or more modules in exemplary embodiments of the claimed invention. It should be appreciated that such functional blocks may be realized by any number of hardware and/or software components configured to perform the specified functions. Accordingly, embodiments disclosed herein may employ various integrated circuit components, e.g., memory elements, processing elements, logic elements, look-up tables, and the like, which may carry out a variety of functions under the control of one or more microprocessors or other control devices. Similarly, the software elements of the present disclosure may be implemented with any programming or scripting language such as C, C++, Java, COBOL, assembler, PERL, Visual Basic, SQL Stored Procedures, AJAX, extensible markup language (XML), with the various algorithms being implemented with any combination of data structures, objects, processes, routines or other programming elements. Further, it should be noted that the present disclosure of the claimed invention may employ any number of conventional techniques for data transmission, signaling, data processing, network control, and the like. Still further, embodiments of the claimed invention may detect or prevent breaches in security with a client-side scripting language, such as JavaScript, VBScript or the like.

Additionally, many of the functional units and/or modules herein may be described as being "in communication" or "in operable communication" with other functional units and/or modules. Being "in communication" or "in operable communication" refers to any manner and/or way in which functional units and/or modules, such as, but not limited to, computers, laptop computers, PDAs, modules, network servers, routers, gateways, and other types of hardware and/or software, may be in communication with each other. Some non-limiting examples include: (i) activating or invoking another such functional unit or module, and (ii) sending, and/or receiving data or metadata via: a network, a wireless network, software, instructions, circuitry, phone lines, Internet lines, satellite signals, electric signals, optical signals, electrical and magnetic fields and/or pulses, and/or so forth.

Communication among the parties in accordance with the present disclosure may be accomplished through any suitable communication channels, such as, for example, a telephone network, an extranet, an intranet, Internet, point of interaction device (point of sale device, personal digital assistant, cellular phone, kiosk, etc.), online network communications, wireless communications, local area network (LAN), wide area network (WAN), networked or linked devices and/or the like. Moreover, although the network communications may be implemented with TCP/IP communications protocols, such communications may also be implemented using IPX, Appletalk, IP-6, NetBIOS, OSI or any number of existing or future protocols. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997), the contents of which are hereby incorporated by reference.

For the computational instructions (e.g., software, scripts, firmware, etc.) and/or associated data disclosed or required due to the functional units or modules described herein, it is within the scope of the present disclosure to explicitly include storage media for storing such instructions and/or data whether such storage media is for storing such instructions and/or data in a transient or non-transient form. For example, such storage media may be: computer readable magnetic disks or tape, optical disks, and other non-volatile transportable memory (e.g., USB memory sticks, etc.).

As used herein, "comprising," "including," "containing," "is," "are," "characterized by," and grammatical equivalents thereof are inclusive or open-ended terms that do not exclude additional unrecited elements or method steps unless explicitly stated otherwise. "Comprising" is to be interpreted as including the more restrictive terms "consisting of" and "consisting essentially of"

RELATED PRIOR ART INCORPORATED HEREIN BY REFERENCE

The following references (a) through (o) are related to present disclosure, and each is fully incorporated herein by reference. Moreover, each of the systems and methods disclosed in the following references (a) through (o) may be included in one or more embodiments of the method and system for financing companies as described in the Summary section hereinabove, and as further described in hereinbelow following the descriptions of the references (a) through (o).

(a) U.S. Patent Application Publication No. 2006/0112003, filed Nov. 1, 2005 which discloses a method and apparatus for conducting a live auction that combines various features of traditional and online auctions. The live auction includes a live, in-person auction component and a real-time online bidding environment component. Bidding information associated with an item in the online bidding environment is updated to reflect a current bid associated with the item in the live, in-person auction. During the live, in-person auction, a bid is be accepted from an online bidder in the online environment that reflects the online bidder's bid price for the item. Subsequently, the system bids on behalf of the online bidder against other online bidders as well as one or more live bidders that are participating in the live, in-person. As such, the live auction enables real-time online bidding in a live, in-person auction.

(b) U.S. Pat. No. 6,446,048, filed Sep. 3, 1999 which discloses systems, methods and related software products which enable users to temporarily store and subsequently retrieve information. The system includes a plurality of input devices, client computers (each having a user-specific personal finance application) and a website server with a database. The input devices, client computers and server are communicatively linked via a communication network so that a plurality of users can temporarily store and/or manipulate financial transaction information on the server from any of the input devices. Each user can also transmit financial profile information to the server. This information enables the server to replicate the unique profile characteristics for each of the finance applications. This, in turn, simplifies remote entry of information, subsequent download of that information and integration of such information into each user's personal finance application. When the user accesses a respective client computer having the user's customized personal finance application, the user can download the previously stored information and automatically integrate the information into the user's personal finance application.

(c) U.S. Patent Application Publication No. 2001/0053988, filed May 8, 2001 which discloses a method for providing asset fluctuation stock insurance services and a computer-readable record medium for storing a program of realizing the method. The object of this patent application publication is to provide a method for providing asset fluctuation stock insurance services in order for investors and companies to operate stable funds through stock trading and self-keeping under the control of a computing system. The present patent application publication comprises the steps of: (1) accepting an initial entry of a holding financial company for asset fluctuation stock insurance services by an asset fluctuation management server; (2) determining shares of participant companies based on assets ratios and carrying out share swaps among the participant companies and the holding financial company by the asset fluctuation management server; (3) determining and carrying out allocations of a predetermined portion of the shares the holding financial company swapped based on evaluations of the participant companies by the asset fluctuation management server; (4) verifying market value fluctuations of the holding financial company and determining swap ratios of additional participant companies by the asset fluctuation management server; and (5) storing in a data storage unit and managing items on operations and fluctuations of the holding financial company by the asset fluctuation management server.

(d) U.S. Patent Application Publication No. 2003/0182230, filed Feb. 14, 2003 which discloses methods, systems, and articles of manufacture for conducting financial transactions over a network. A user requests to execute at least one financial transaction with at least one of a number of parties, each of the parties corresponding to a data processing system on the network. Real-time financial information relating to the financial transaction is obtained, and the user can test and confirm that the financial transaction with the at least one party can take place prior to execution of the financial transaction.

(e) U.S. Patent Application Publication No. 2009/0089126, filed Oct. 1, 2008 which discloses a method and system for developing and deploying an automated corporate governance rating software system for reducing the cost of research comprising analyzing data and generating scores. The system further comprises rating the performance of the leadership team, board of directors and executives of public and private companies. The system comprises web portals wherein a user selects a company of interest and a corporate governance score for that company is generated. The method further comprises retrieving the company's securities filings from the U.S. Securities and Exchange Commission's (SEC) database, generating the company's ratings. The method comprises domain-specific natural language questions, extracting concepts based on such a venture and automatically extracting and analyzing data to generate answers based on securities filings at the U.S. SEC. The method further comprises using over 200 corporate governance variables and an algorithm to generate corporate governance ratings and deliver them to the user via a web portal.

(f) U.S. Pat. No. 5,926,792, filed Sep. 18, 1998 which discloses a method and system to track, reconcile and administer the values of life insurance policies in separate accounts, including Stable Value Protected funds. Accordingly, targeted returns are translated into unit values on a daily basis for each fund. Additionally the system tracks restrictions (e.g., timing, amount of withdrawal and amount of reallocations) on a premium-by-premium basis, and tracks the book value, market value, duration and targeted return on a client-by-client basis. The system calculates and tracks the payments and credits applicable to a withdrawal or reallocation request, in addition to the liquidation schedules for each fund based on the payment amounts and credits of specific funds. Additionally, daily unit values are calculated given a periodic targeted return (i.e., a quarterly targeted return).

(g) U.S. Patent Application Publication No. 2008/0077539, filed Sep. 20, 2007 which discloses a method for investing in a managed list of equities. The method can comprise issuing a security instrument, and using funds invested into said security instrument to purchase equity shares in a group of companies indicated in an investment analysis result. The investment analysis result can be created by analyzing information describing a plurality of companies according to a set of analysis rules and selecting a subset of said plurality of companies as said group of companies.

(h) U.S. Pat. No. 7,292,994, filed Feb. 15, 2001 which discloses a system and method for developing intellectual property (IP) assets, by collecting one or more IP assets in accordance with a characterization; determining a market value for the collection in accordance with a plurality of uses for the assets so characterized; holding the collection in an investment trust (IT), which is sold to investors; and exploiting the collection, using investor contributions to make markets for the various uses of the asserts, obtaining revenue in these markets, and distributing profits to the investors.

(i) U.S. Pat. No. 6,236,972, filed Dec. 21, 1998 which discloses a method and device for using a computer to facilitate a transaction of secondary market shares of an investment company such as a mutual fund between a buyer and a seller, having the steps of: a customer determining the mutual fund to be traded receiving a schedule of fees from the central controller, the customer selecting the class of shares and inputting the quantity to be traded, the customer selecting the order type and adding any special instructions. The customer then submits the order to the central controller. The central controller will match buyers and sellers and determine which orders were executed. For all executions, the central controller will provide the seller with payments and the buyer with shares in the selected mutual fund.

(j) U.S. Patent Application Publication No. 2003/0126051, filed Oct. 10, 2002 which discloses a method, system, and software for enhancing valuations of companies having limited or negative worth using a reverse merger, by identifying a suitable company based on financial and operational data of companies. Comparable listed companies on a target market or exchange are found to identify a target merger partner from the comparable listed companies based on selection criteria. The suitable company and the target merger company are merged to form a new public entity that is listed in the target market or exchange; and at least some of the debt or liabilities in the suitable company are exchanged with equity in the new public entity.

(k) U.S. Pat. No. 6,879,964, filed Mar. 7, 2001 which discloses an investment company which is administered by issuing one or more classes of shares that are bought from and redeemed with the company at a net asset value, issuing one or more classes of shares that are listed for trading on a securities exchange and that are bought and sold at negotiated market prices, and maintaining, in one or more computers, account data of the outstanding shares. A shareholder may acquire exchange-traded shares by requesting conversion of a designated number or dollar value of shares belonging to the one or more classes of shares that are bought from and redeemed with the company at a net asset value for a monetarily equivalent number of shares of the one or more classes of shares which are exchange-traded shares of the company. An authorized participant may purchase exchange traded shares directly from the investment company in exchange for a basket of securities of generally equivalent monetary value. A direct purchase requires a purchase of a predetermined number of exchange-traded shares. An investor may also purchase or sell exchange-traded shares on the secondary market through a broker. The exchange-traded shares may be issued by an open-end mutual fund, a closed-end mutual fund, or a unit investment trust.

(l) U.S. Patent Application Publication No. 2003/0061139, filed Sep. 27, 2001 which discloses a private trust used to diversify risk for holders of stock in private companies that have received venture capital funding. The private trust accepts donations of the stock in exchange for trust units. The private trust pools the stock and manages the stock to yield income for trust unit holders. The private trust holds the stock until after initial public offering and escrow restrictions have expired. The public shares are then sold at the discretion of trust managers to earn the income for the private trust. Shares of pre-approved companies may be donated to the private trust using worldwide web enabled forms. The private trust diversifies risk because income/losses from trust units flow collectively from all privately-held shares managed by the private trust.

(m) U.S. Pat. No. 7,590,595, filed Feb. 14, 2003' which discloses methods, systems, and articles of manufacture for conducting financial transactions over a network. A user requests to execute at least one financial transaction with at least one of a number of parties, each of the parties corresponding to a data processing system on the network. Real-time financial information relating to the financial transaction is obtained, and the user can test and confirm that the financial transaction with the at least one party can take place prior to execution of the financial transaction.

(n) U.S. Patent Application Publication No. 2004/0260643, filed Jun. 18, 2003 which discloses an investment vehicle comprising a synthetic corporate exchangeable note linked to the equity return and credit of select third parties. A computer system creates, tracks and implements the investment vehicle in accord with program-controlled processing. A highly flexible, cost-efficient security is created having enhanced risk/return characteristics.

(o) U.S. Pat. No. 5,689,650, filed Feb. 23, 1995 which discloses an apparatus that compiles investor needs for Community Reinvestment Act (CRA) qualified assets, creates portfolios of assets that would be recognized by regulatory agencies as meeting the requirements of the CRA and allocates CRA credits separately from the financial return of the portfolio of assets. The CRA apparatus can acquire CRA eligible loans from the secondary market, directly from private or governmental agencies, and/or directly from loan originators. The CRA apparatus determines whether an asset meets CRA qualifying parameters from demographic and statistical data regarding the borrower and/or the financial asset. The apparatus determines, by using CRA qualification factors as well as investor requirements, whether a loan should be acquired. In a parallel accounting process, the apparatus creates a pool of CRA eligible "credits" from the assets in each portfolio and then tracks and allocates specific CRA credits associated with specific assets to specific portfolio investors. This allocation of CRA credits creates specific "CRA interests" for each investor. These interests would be recognized by regulatory agencies as meeting the requirements of the CRA. The invention can provide a complete audit trail for the allocation of CRA interest and can generate the information necessary to comply with all regulatory reporting requirements. The CRA apparatus allows investors to obtain and report geographically specific CRA interests while participating in a diversified, risk managed portfolio.

DESCRIPTION OF THE FIGURES & PROCESSES THEREFOR

Referring to FIG. 1, an Internet/network architecture for operating an embodiment of the holding company as described in the Summary section hereinabove is shown, wherein the holding company is identified as the holding company portal 20 in FIG. 1. Accordingly, it is an aspect of the present disclosure that the components of the holding company portal 20 shown in FIG. 1 can be considered a computational machine specifically configured to perform the method of financing investment seeking companies (e.g., startup companies) disclosed herein. Moreover, each of the components of the portal 20 shown in FIG. 1 and the data management systems also shown in FIG. 1 also can be implemented as a computational machine specifically configured to perform their respective functions.

Before providing details regarding the portal 20, the context or environment within which the portal 20 (or variations thereof) are described. Accordingly, instead of, or in addition to the Internet, the network 24 may be any of: a local area network, a secure enterprise wide area network, a virtual private network, or any network having secure communications wherein financial transactions cannot be spoofed, intercepted and deciphered or modified by an unauthorized third party. Additionally, it is worthwhile to note that a non-network version of the holding company operations according to the disclosure herein is contemplated and is considered an alternative/additional embodiment of the operations performed by the holding company. Moreover, in one embodiment of the holding company's operations, operator stations 32 may be provided wherein personnel 36 in the service of the holding company may assist investors with holding company services (e.g., performing buy/sell orders, investor questions, investor account advisors, etc.). In such an embodiment, the personnel 36 may converse with investors 32 in person or via a communications network for providing information to the holding company, and/or retrieving investor information from the holding company's records after appropriate authentication of the investor.

Referring now to the holding company portal 20 (FIG. 1), the portal includes a network interface 40 for communicating with investors 32 and/or holding company personnel 36, e.g., via the network 24. The interface 40 provides communication with the network 24 as one skilled in the art will understand, and may include various scripting language programs (e.g., CGI, Java or other such user interface languages) for handling network user input and for routing appropriate webpage responses thereto. In particular, network interface 40 may include a service manager (not shown) as well as various user request handlers, wherein the service manager identifies a network input and provides such input to an appropriate request handler. For various network inputs, the request handlers activate at various programs of the following controllers: the investor interaction controller 44, the third party brokerage interaction controller 48, and the ISC interaction controller 52, each of which is described hereinbelow. In one embodiment, such request handlers distribute network requests according the request load, e.g., during high volumes of network requests such request handlers may perform load balancing between a plurality of portal 20 functional units that can perform the same portal 20 tasks.

The investor interaction controller 44 communicates with investors 32 and/or personnel 36 for entering, modifying and retrieving investor information. In one embodiment, the investor interaction controller 44 provides and activates high level programs for:
  (a) Authenticates investors 32 and personnel 36;
  (b) Registers new investors 32;
  (c) Determines user interface presentations (web pages) to present to investors 32 and personnel 36;
  (d) Parses network investor 32 and personnel 36 requests for identifying data herein, and activating other portal 20 functional units for fulfilling such requests; in particular, the investor interaction controller 44 coordinates internal portal 20 interactions between various function units of the portal 20, e.g., during a holding company ISC stock option, the investor accounts manager 56 (described hereinbelow), and the stock auctioning subsystem 60 (described hereinbelow) may be both activated when an investor bids on shares of a newly issued ISC stock, and accordingly, coordination of information flows between these two functional units of the portal 20 may be provided by the controller 44.
  (e) Retrieves and/or generates appropriate forms and presentations for outputting to the investor 32 or personnel 36.

The investor interaction controller 44 interacts with the investor accounts manager 56 for receiving investor information, retrieving investor information, performing accounting tasks on investor portfolios, providing investor notifications (e.g., insufficient funds for an ISC stock purchase, notification of a stock purchase/sale, notification of a margin call, notification of a conversion of an ISC stock to a publicly traded stock of an IPO of the investment seeking company for the ISC stock, etc.).

The investor accounts manager 56 retrieves and stores investor information (as requested, e.g., via the investor interaction controller) from/in the investor data management system 64. The investor information stored in the investor data management system 64 includes the following:
   (a) Investor identification information (name, address, investor authentication information such as a password, etc.),
   (b) Investor profile information, e.g., (i) types of investments desired, including technological, product or service categories of interest to the investor, size of ISCs of interest to the investor, capitalization of ISCs of interest to the investor, volatility rating ISCs of interest to the investor, etc., (ii) investor income and/or amount that the investor wants to invest, (iii) investor credit information, (iv) beneficiary information, etc.
   (c) Investor stock portfolio information, e.g., (i) the identity of the various one or more classes of holding company stock, and the amount of stock that the investor currently owns and/or has previously purchased, wherein such stocks have their assets substantially based on one or more ISCs, (ii) the amount of money gained or lost on each class of holding company stock, and (iii) information regarding conversions of holding company stock.
   (d) Investor bid or ask information indicating what the investor is willing to buy or sell various holding company classes of stock for, including stop loss order information, etc.
   (e) Investor funds on deposit with the holding company (or guaranteed to be available to the holding company) for holding stock purchases, such as, for stock purchases in a stock auction by the holding company of a new class of stock whose assets are substantially based on one or more ISCs.
   (f) Investor outstanding calls and puts on each ISC stock wherein the investor has such.
   (g) Investor margin call information regarding margin calls that may be applicable to the investor.
   (h) Third party brokerage information related to a third party stock broker used by the investor.

The investor data management system 64 (as well as the other database management systems disclosed herein) may be implemented via various commercial database management systems such as those provided by Oracle®, Microsoft® and others.

The investor interaction controller 44 interacts with the stock auctioning subsystem 60 for entering ISC stock bids on newly issued ISC stock, providing investors 32 with notifications (e.g., via the network 24 and each investor's respective computer 28) raises to their bids, accepted bids, and other information appropriate for bidders according to the type of auction being conducted.

The investor interaction controller 44 also interacts with the holding company stock management subsystem 68 for communicating various notifications and other stock related information to investors 32, and/or personnel 36. More particularly, the stock management subsystem 68 performs the following tasks for the portal 20:
   (a) Provides notification to investors 32 of new ISC stock classes to be issued by the holding company via, e.g., the stock issuance module 72 (FIG. 1). Such notifications may include financial reports on the ISC for the ISC stock class to be issued as well as the terms, conditions, and any restrictions attached to the ISC stock once issued. Note that such attachments to ISC stock may include one or more of: (i) an option/requirement to convert the ISC stock to stock directly issued by the ISC after an IPO by the ISC occurs, (ii) an option/requirement to convert the ISC stock to a debit financial instrument assumed by the ISC, (iii) an option/requirement to convert the ISC stock to preferred stock directly issued by the ISC, (iv) an option to exchange the ISC stock (or a portion thereof) for another ISC stock (at, e.g., a predetermined price) if the ISC upon which the ISC stock is based fails, (v) an option to purchase additional quantities of the ISC stock at a fixed price and/or at a price relative to a current market price, (vi) a requirement to hold the ISC stock for a particular length of time, e.g., after initial purchase, etc.
   (b) Maintains bid and ask prices for ISC stocks (after initial issuance and sale) for communication of such information to investors 32, personnel 36, and third party stock brokers 80. In particular, the stock broker module 84 performs this function.
   (c) Provides for the buying and selling of holding company ISC stock directly and/or via a third party broker 76, wherein this task is also performed by the stock broker module 80.
   (d) Notifies holding company ISC stock holders of conversion rights for converting a class of holding company ISC stock corresponding to, e.g., an ISC to initial public offering of stock directly in the ISC. Note this task is also more specifically performed by the stock broker module 80. In particular, conversion options/requirements may be any of those described in (a)(i) through (a)(vi) immediately above.
   (e) Converts holding company stock into ISC initial public offering of stock, e.g., via the stock conversion module 88.

Note that the management subsystem 68 and its submodules may receive and archive ISC stock related data and transactions therefor in the holding company stock transaction data management system 92. Accordingly, the data management system 92 provides data storage and access to, e.g.:
   (1) Data related to (and/or identifying) private equity in ISC stocks owned by the holding company. Note that an ISC portfolio manager 94 may be provided to assist holding company personnel in entering and maintaining ISC records in the holding company stock transaction data management system 92 (and/or in the investment seeking company data management system 100 described hereinbelow).
   (2) Data related to (and/or identifying) ISC stock owned by investors, and the holding company.
   (3) Data related to (and/or identifying) restrictions and/or options for selling, exchanging, converting, and/or purchasing additional ISC shares (e.g., conversion options/requirements as described in (a)(i) through (a)(vi) immediately above and including any dates or timeframes related thereto).
   (4) Data related to (and/or identifying) any other ISC contractual obligations with the holding company and/or with the ISC stock holders, e.g., minimum amount of equity that the holding must offer in an ISC stock issuance.
   (5) Bid and asked prices for ISC stocks both during an ISC stock auction and after such an initial offering.

Regarding the ISC portfolio manager 94 identified above, this manager may perform the following functions:
   (a) Maintains stored records identifying the private ISC equities owned by the holding company.

(b) Maintains stored records identifying the private ISC equity of each ISC that has been used to back an ISC stock issued by the holding company.

(c) Generates analytical reports on historical success/failure of ISCs and ISCs having various characteristics (e.g., primary technology or field thereof, ISC size, ISC financial characteristics such as indebtedness, revenues, etc.), wherein such reports may assist the holding company in determining or predicting whether to accept a particular company as an ISC, what contract conditions should be imposed on a company desirous of becoming an ISC, what private equity stake the holding company should request from a company desirous of becoming an ISC, etc.

Regarding the third part brokerage interaction controller 48, this controller may share many (if not most) of its functional programmatic units with the investor interaction controller 44 since such third party brokerage entities 80 may be acting as representatives of their clients as investors 32. However, the controller 48 may include additional authentication procedures for authentication of the third party brokerage entity 80 as well as verifying the identify of an investor and that the brokerage entity is authorized to represented investor.

Regarding the ISC interaction controller 52, this controller processes network 24 requests from ISCs 96 and provides notifications to such ISCs as well. In particular, the controller 52 performs at least the following tasks:

(a) Performs authentication of ISC network communications.

(b) Processes ISC data input/notifications such as a notification to the holding company that the ISC is preparing to issue an IPO; a change of address of the ISC; a notice of ISC bankruptcy; a notification of an ISC dividend or other income to be distributed to investors in the ISC; notification of a merger with another company; notification of a request for an additional round of funding via the holding company; notification of an invocation of a stock buyback clause (should such a clause be in the ISC agreement with the holding company); etc.

(c) Fulfills ISC requests for, e.g., ISC evaluation queries such as: when is or how much is the next distribution of holding company funds to the ISC; what other ISCs is the ISC being compared; who are the investors in the holding company stock for the ISC, etc.

(d) Generates holding company notifications to the ISCs, including: notifications regarding a rating or ranking of an ISC in comparison to other ISCs; notification of a distribution of holding company funds to an ISC; notification of a corresponding ISC stock price, e.g., obtained from an auction of such stocks; notification of a change in the ISCs to which a given ISC is to be compared for funding purposes; notification of a (significant) change in the escrow(s) from which the ISC receives funding; etc.

The ISC interaction controller 52 may fulfill many of the ISC requests received by querying the investment seeking company data management system 100, wherein this data management system stores and provides data access to at least the following ISC related data:

(a) Copies of holding company agreements with ISCs (and amendments thereto), e.g., provided in the ISC agreements data management subsystem 104.

(b) For each ISC, the amount of total private equity owned by the holding company.

(c) For each ISC, the amount of private equity used for backing a holding company class of public ISC stock.

(d) Holding company sector classification(s) (if any) for each ISC, e.g., provided in the ISC evaluation data management subsystem 108.

(e) Data for performing evaluations of each. ISC (e.g., relative weightings in the event that an ISC is classified and compared with other ISCs from two distinct holding company classifications of ISCs; the identifications of each ISCs classification(s); ISC milestone conditions imposed for evaluation; etc.), e.g., provided in the ISC payouts data management subsystem 112.

(f) Publicly traded shares of an ISC owned by the holding company.

(g) Identification of which round of holding company financing each ISC has obtained.

(h) ISC company contacts.

(i) Triggers for the timing of events stipulated in agreements with ICSs (e.g., dates that an ISC and/or the holding company must timely satisfy certain conditions such as ICS milestones, holding company evaluation of an ICS, recovery of assets or funds from ICS bankruptcy, legal action regarding fraud or other illegal activity by an ICS), e.g., provided in the ISC agreements data management subsystem 104.

For ISC evaluation calculations and notifications, the ISC interaction controller 52 may interact with the ISC evaluation module 116 and/or ISC evaluation data management subsystem 108 for obtaining information on the evaluation of an ISC, and in particular, the amount of capital periodically distributed to the ISCs. Moreover, an investor 32, an operator 36 and/or a third party brokerage entity 80 may also obtain such evaluation information, e.g., after such an evaluation has been used to distribute escrow funds to the ISCs.

Figure 3:
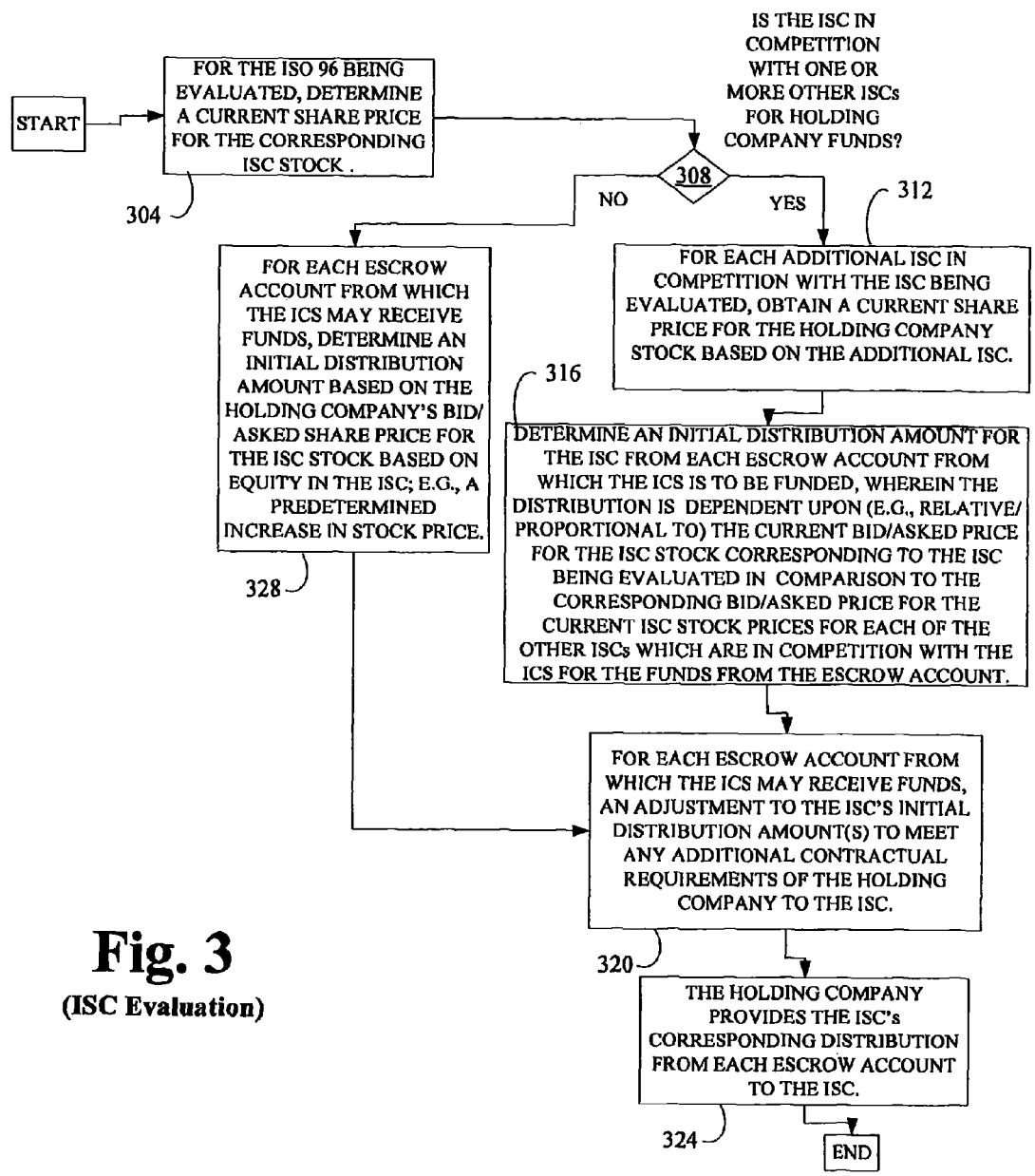
FIG. 3 shows a high level flowchart of an embodiment of the computational machinery process (and, e.g., the computer instructions therefor) performed by the holding for evaluating an ISC and distributing funds thereto.

The ISC evaluation module 116 may compute ISC evaluations and funding computations according to any of the techniques described in Summary section hereinabove, and in one embodiment as shown in FIG. 3 described hereinbelow.

The portal 20 may also provide certain additional functions necessary for the management of the escrow accounts from which the ISCs are funded. In particular, there is an ISC escrow accounts manager 120 for managing the escrow accounts. In particular, the escrow accounts manager 120 may perform the following functions:

(a) Invests escrow accounts in low risk investments that generate consistent reliable income streams from which the ISCs are funded.

(b) May aggregate escrow accounts for investment purposes. For example, two or more relatively small escrow accounts for two distinct classes of ISCs, e.g., an escrow account for an ISC class for solar technology based ISCs, and an escrow account for an ISC class for medical device based ISCs may be combined for investing purposes to thereby obtaining a higher income stream for both escrow accounts.

(c) Performs accounting to channel appropriate portions of investment income streams into different escrow accounts for ISCs.

(d) Maintains a contingency account for use in the event of substantially reduced investment income streams to the escrow accounts.

(e) Provides notifications to ISCs (and optionally to investors) as to the escrow income for funding ISCs. In particular, such notifications are performed via the portal 20 and the network 24, and more particularly, the ESC escrow accounts manager 120

(f) Distributes funds to ISCs from escrow accounts according to ISC evaluations and any other ISC contractual funding obligation.

Note that escrow account data generated by the ISC escrow accounts manager 120 may be stored in the escrow accounts data management system 124. In particular, the data management system 124 provides storage and access for at least the following:

(a) Identification of each escrow account.
(b) For each escrow account, the identification(s) of the investment(s) for the account, the amount invested in each investment, the expected rate of return, triggers for notification of investment income to be received.

It is worthwhile to note that the portal 20 of FIG. 1 is but one representative embodiment for performing the operations of the holding company according to the present disclosure. Alternative embodiments include multiple portals 20 distributed over a network such as the Internet, wherein investors 32 may be routed to a nearest such portal 20 and/or a portal 20 having appropriate computational capacity to timely handle investor network interactions. In one embodiment, a portal 20 may contain multiple copies of its functional components such as those described above. Moreover, such portal functional components may themselves be dispersed on the network 24. For example, the database management systems shown in FIG. 1 may be resident at a one or more network 24 sites different from the portal(s) 20. In particular, such database management systems may reside at sites designed to maintain the integrity of data in the event of various catastrophic events (e.g., floods, earthquakes, etc.). Additionally, one or more call centers may be provided for interacting with, e.g., investors 32. Furthermore, holding company interactions with investors 32, ISCs 96, and third party stock brokerage entities 80 may be performed without the use of the network 24. Instead, face to face personal interactions are also acceptable. However, the computational components of the portal 20 of FIG. 1 (and the computational machinery providing such components) are also applicable to such alternative ways of interacting with investors 32, ISCs 96, and third party stock brokerage entities 80.

Figure 2:
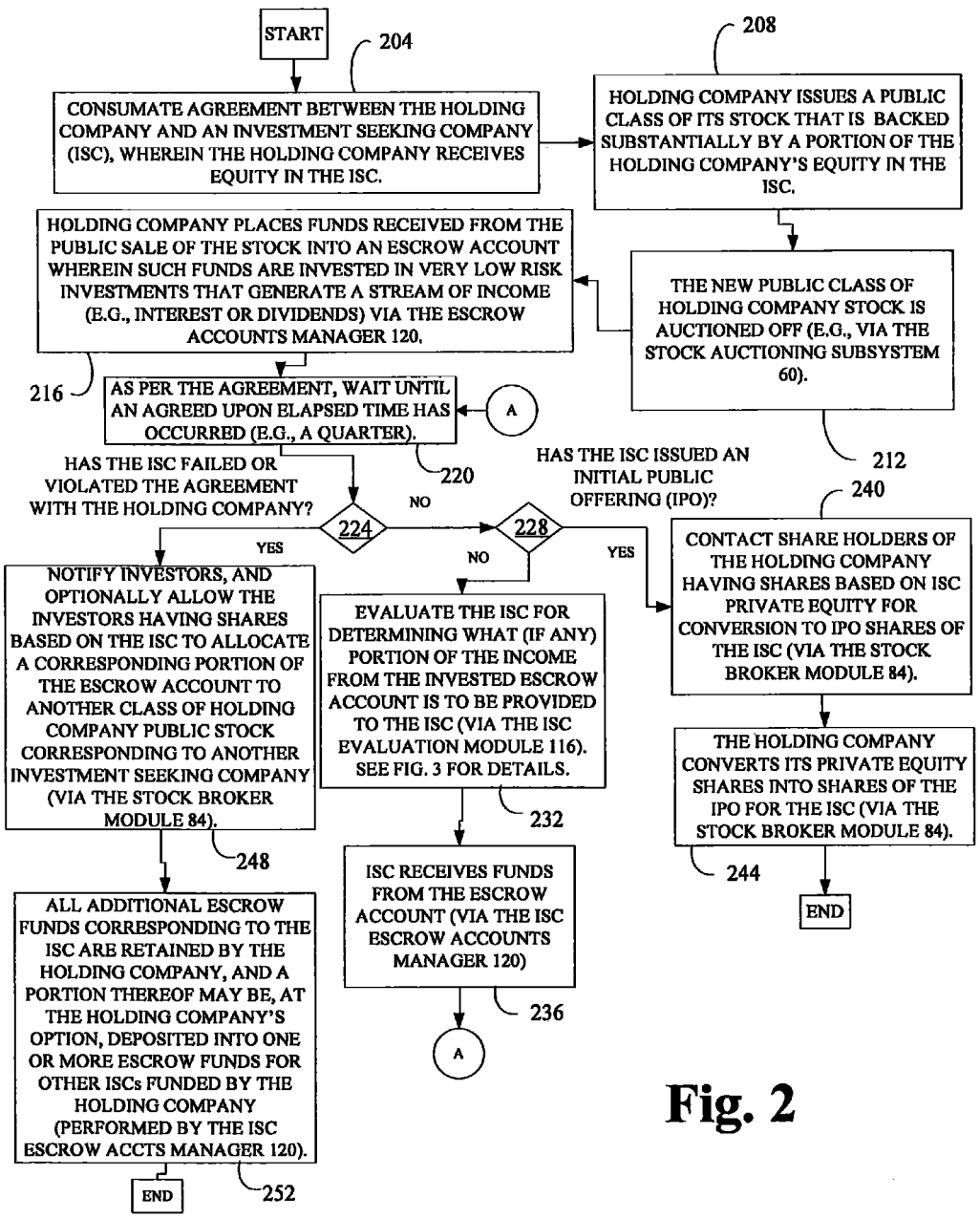
FIG. 2 provides a high level flowchart of an embodiment of the computational machinery process (and, e.g., the computer instructions therefor) performed by the holding company when providing funding to ISCs according periodic or iterative evaluations of such ISCs, wherein such evaluations are at least partially based on the corresponding holding company's publicly traded class of stock whose value is derived private equity in the ISCs owned by the holding company.

FIG. 2 provides a flowchart of one embodiment of the high level operations of the holding company as such operations relate to an ISC 96. In step 204 of FIG. 2, an agreement is consummated between the holding company and an ISC 96, wherein the holding company receives private equity in the ISC in exchange for the holding company's services of: (i) issuing holding company stock backed by the assets of the ISC, (ii) funding the ISC 96 from the proceeds of the sale of the ISC stock via evaluations of the ISC, e.g., periodically for determining an appropriate funding levels for the ISC, and (iii) distributing marketing materials regarding the issuance of ISC stock to prospective investors 32 and third party stock brokerage entities. Such an agreement may include conditions related to: (i) the evaluation criteria for evaluating the ISC 96, the classification(s) of the ISC for determining other ISCs which the ISC may be competing against for receiving funding, (ii) a minimum funding level (e.g., for an initial time after ISC stock sale), (iii) a maximum number of other ISCs with which the ISC 96 must compete for funding, (iv) a minimum amount of one or more holding company escrow accounts from which funds may be distributed to the ISC, etc. Note that the holding company may provide electronic presentations to prospective ISCs wherein such a prospective ISC may provide information so that the holding company can assess whether to accept the prospective ISC, (v) the amount of private equity provided to the holding company for each new round of funding by the holding company (e.g., an initial or subsequent issuance of ISC stock by the holding company for providing periodic capital distributions to the ICS, and/or a lump sum payment to the ISC from the sale of such ISC stock, and/or (vi) the minimum amount of the ISC's private equity that will be sold to investors 32. Note that the terms and conditions of the consummated agreement and documents related thereto are electronically captured in the investment seeking company data management system 100 and the holding company stock transaction data management system 92. More particularly, the agreement and related documentation may be archived in the ISC agreements data management subsystem 104, and various portions of the terms and conditions of the agreement may be programmed into the ISC payouts data management subsystem 112 and/or the ISC evaluation data management subsystem 108 so that proper funding of the ICS 96 can occur.

Assuming a prospective ISC and the holding consummate an agreement, in step 208 (FIG. 2) the holding company issues a public class of its stock that is backed substantially by a portion of the holding company's private equity in the ISC 96. Note that such stock issuance may be performed using the stock issuance module 72 (FIG. 1), wherein legal documents are entered into the investment seeking company data management system 100, and prospective investors 32 (as well as potential investors), and third party stock brokerage entities 80 are notified of an auction of the newly issued ISC stock.

Subsequently, in at least one embodiment, step 212 is performed wherein the holding company holds an auction of the newly issued ISC stock. The auction may be conducted by the stock auctioning subsystem 60 via the network 24 and on-line in real time (or near real time) or another appropriate method. The auction may be performed according to any of the auction techniques identified in the Summary section hereinabove, or another technique. In one embodiment, the lowest share bid price (e.g., for a predetermined number of shares) of a predetermined number of the highest bidders (e.g., 100 highest bidders) becomes the initial share price, wherein the 100 highest bidders are committed to purchase the shares which their highest bids correspond (but at the lowest bid price obtained from the predetermined number of highest bids). Note that such an auction may include a minimum share price bid, and if this minimum bid is not received, the holding company may have the right to: (i) increase the private ICS equity that corresponds to the shares to be auctioned, (ii) reduce the number of shares to be issued (e.g., for the same amount of ISC equity), (iii) withdraw the ISC stock offering, or (vi) purchase the ISC stock itself at a share price at or below the minimum share price. Note that in one embodiment, the auction may take place over a number of days, wherein there is a pre-set time and date for ceasing to accept new bids.

Assuming the ISC stock is purchased, in step 216, the funds received from stock sale are deposited in one or more designated holding company escrow accounts, and the ISC escrow accounts manager 120 is activated to update the escrow accounts data management system 124 with information indicative of the additional funds to be escrowed. Note that in providing the data management system 124 with appropriate information, the ISC escrow accounts manager 120 receives data from the investment seeking company data management system 100 regarding, e.g., any one or more existing escrow accounts in which the new funds are to be deposited, as well as any new escrow account to be created for the funds. For example, if the ISC 96, company A, is a robotics based startup company having revenues of $2 million, wherein the robots are targeted for use in cleaning nuclear power plants and sewers, and additionally in military surveillance as well as medical response in hazardous situations, then such an ISC may be classified in one or more existing classifications of aerospace and rocket based technology, environmental cleanup, and military suppliers as well as with other ISCs that have annual revenues of between $1.5 million and $3 million. However, this ISC may be also classified in a new category of robotics. Moreover, e.g., depending on where the ISC 96 is currently deriving its revenues, the ISC's evaluations may be determined by weighting it's ranking in each of the categories in which it is assigned. Thus, if company A has 60% of its revenues from the use of robots in aerospace and rocket based technology, 20% each in military applications and environmental cleanup, then company A may be, e.g., assigned weights in the same relative order as the percentages above. Thus, the following weightings might be assigned to company A for both depositing the funds received by the holding company from the sale of the ISC stock base on company A: 0.4 for the aerospace and rocket based technology category, 0.15 for each of the military applications and environmental cleanup classifications, plus, 0.1 for the class of ISCs having revenues in the range of between $1.5 million and $3 million, and 0.2 for the new category of robots. Thus, these weightings (which preferably should sum to the value one) would be used to both allocate the capital received from company A's ISC stock sale, and additionally (as described further below) be used for escrow distributions as well. Accordingly, 40% of such capital from company A's ISC stock sale would be deposited in the escrow account for ISCs classified in the aerospace and rocket based technology category, 15% of such capital would be deposited in each of the escrow accounts for environmental cleanup and military suppliers, and 10% would be deposited in the escrow account for ISCs having revenues in the range of between $1.5 million and $3 million, and 20% in the new escrow account for robots technology companies. It is worth noting, however, that although the weighting above may be related to the proportion of revenue derived by company A from various sources, such weightings can be determined in various ways including negotiations between the ISC 96 and the holding company, product development expenditures, etc. Additionally, such weightings can be adjusted over time with a corresponding adjustment in the corresponding escrow accounts funded by the sales of the ICS stock for the ISCs as will be further described hereinbelow.

In step 220, as per the agreement between the holding company and the ISC, there are typically periodic distributions of funds to the ISC 96, and accordingly the holding company may wait for a particular elapsed time prior to performing other actions related to distributing funds to the ISC. However, in one embodiment, the time periods need not be uniformly spaced time periods such as quarters. Instead, at least some time periods may be dependent upon, e.g., one or more particular triggering events such as a milestone being attained by the ICS 96, e.g., the ISC obtaining (or losing) a new large client or signing a new contract to provide long term services to a large client. Accordingly, step 220 may be event driven rather than time driven.

Once a particular time period has elapsed (e.g., due to a particular triggering event), the holding company may first perform one or more inquiries as to the status of the ISC 96. In particular, decision step 224 may be performed for determining whether a condition has occurred that would likely terminate or temporarily prevent the holding company from distributing funds to the ISC 96. In particular, a determination may be made as to whether the ISC 96 has failed (e.g., been declared insolvent), or has violated its agreement with the holding company in a manner so that the holding company is not obligated to fund the ISC 96 for at least the next one or more ISC funding distributions. In addition to notification that the ISC 96 has failed, other conditions that may preclude the holding company from distributing escrow funds to the ISC 96 may be: (a) failure to maintain it ISC stock price above a particular price, (b) failure to report on its financial condition, (c) failure to meet a particular milestone, (d) failure to provide an agreed upon dividend or other financial distribution to one or more investors 32, and/or (e) failure to make a payment on a debt owed by the ISC. In general, the holding company may initiate such investigations as may be considered prudent and cost effective for assuring that the ISC 96 is in sufficiently good standing to warrant another distribution from the escrow account(s). In some circumstances where there is ambiguity or it is a judgment call as to whether the holding company should proceed with one or more next funding distributions to the ISC 96, the holding company could be accused of manipulating the share price of the ISC 96 since a decision by the holding company not to fund the ISC would certainly affect the ISC's share price. Accordingly, such determinations as made in step 224 may be performed by a third that is mutually agreeable to both the holding company and the ISC 96.

Subsequently, assuming the ISC 96 has not failed or violated its agreement with the holding company sufficiently for the holding company to withdraw funding, in step 228, the holding company may determine if the ISC 96 has issued an initial public offering of its own stock. Note that as with step 224 above, step 228 may be performed by a third party that is acceptable to both the holding company and the ISC 96 since there may be a possibility that a certain transaction(s) by the ISC may be disputed as to whether it constitutes an initial public offering.

Assuming that no initial public offering has been issued by the ISC 96 (or at least no such IPO that would prevent a further distribution of escrow funds to the ISC), in step 232, the holding company evaluates the ISC (e.g., via the ISC evaluation module 116) for determining what (if any) portion of the income from the invested escrow account(s) is to be provided to the ISC. In at least one embodiment, it is anticipated that such evaluations will be sufficiently free of ambiguity or judgment calls on the part of the holding company that it may perform these evaluations itself. However, it is also contemplated that such evaluations may be performed by a mutually agreement upon third party contracted by the holding company. A description of embodiments for how to compute such evaluations is described hereinbelow in conjunction with the description of FIG. 3.

Subsequently, in step 236, the computed funding distribution for the ISC 96 is provided to the ISC by the ISC escrow accounts manager 120 which may perform an automated wire transfer to a bank account for the ISC 96. Following this step, step 220 is again encountered, wherein there is a waiting period prior to a next determination as to whether another escrow account distribution is to be made to the ISC 96.

Returning now to step 228, if it is determined that the ISC 96 has issued an initial public stock offering (IPO) of it own, then in step 240, the holding company contacts its shareholders who own ICS stock in the ISC 96, and informs such shareholders of their options regarding converting their ICS stock in the ISC 96 into shares of the IPO offered by the ISC 96. In one embodiment, the agreement between the holding company and the ISC 96 may mandate such conversions. However, other options may also be available, including: retaining the corresponding ISC stock, converting such ISC stock to preferred stock in the ISC, requiring the ISC 96 to buy back the corresponding ISC stock at a price corresponding to a current price of ISC's publicly traded stock, requesting the holding company to exchange the ISC stock for another ISC stock (thereby increasing the holding company's equity in the ISC 96 that has performed the IPO), another ISC, etc.

Subsequently, step 244 is performed wherein the holding company converts its private equity shares in the ISC 96 into shares of the IPO. Note, that the holding company may have substantial flexibility in when such conversion takes place, and accordingly, the holding company may retain its private equity, e.g., until favorable conversion circumstances occur. Moreover, investors 32 may also have the option of having their ISC stock for the ISC 96 converted into public stock issued by the ISC 96 currently with such a conversion by the holding company. Accordingly, any favorable financial circumstances derived by the holding company due to the time of such a stock conversion would also be attained by such investors 32.

Returning now to step 224, if the ISC 96 failed or violated the agreement with the holding company sufficiently to warrant holding company action to the taken against the ISC 96, in step 248, the holding company may notify the investors 32 of such ISC 96 problems. Note that at least some circumstances such failures or violations identified in step 224 may be unambiguous such as receiving a notification of ISC 96 bankruptcy, an impounding of assets by governmental taxing authority, notification of loss of a major contract, a failure to get U.S. FDA approval of a drug, etc. However, other failures or violations may be less clear cut. For example, allegations of inappropriate accounting, misuse of escrow distributions, etc. Accordingly, an appropriate third party may be utilized by the holding company to investigate such matters, wherein confirmation may be grounds for the holding company to terminate its agreement with the ISC 96. Moreover, in one embodiment, in order to both entice potential investors, and to maintain good relations with current investors 32, the holding company may allow investors in the problematic ISC 96 to exchange their ISC shares for this problematic ISC 96 (or a portion thereof) for ISC stock shares in another ISC as also indicated in step 248.

Subsequently, in step 252, all additional escrow deposits corresponding to the problematic ISC 96 are retained by the holding company, and holding company may deposit such retained amounts one or more of the escrow accounts as the holding company sees fit. In particular, the holding company may perform an evaluation of each of the escrow accounts and the ISCs therein for determining the ISC(s) most deserving of having their corresponding escrow accounts increased.

FIG. 3 shows a flowchart for computing an ISC 96 (the evaluation as per step 232 of FIG. 2. In step 304 of FIG. 3, the ISC evaluation module 116 receives a current share of the ISC stock corresponding to the ISC 96 from, e.g., investment seeking company data management system 100.

In step 308, a determination is made as to whether the ISC 96 is in competition with one or more other ISCs (in one or more escrow accounts) for receiving funding distributions. If so, then in step 312, the current ISC stock share price for each of the other ISCs with which the ICS being evaluated is in competition.

Subsequently, in step 316, an initial distribution amount for each escrow account from which the ISC 96 being evaluated receives funding is determined. Each such distribution is at least dependent upon (e.g., relative/proportional to): the current bid/asked price for the ISC stock corresponding to the ISC being evaluated in comparison to the corresponding bid/asked price for the current ISC stock prices for each of the other ISCs which are in competition with the present ICS being evaluated for distributions for the escrow account. In particular, such a comparison may be the ratio of: (i) the current bid/asked price for the ISC stock corresponding to the ISC being evaluated to (ii) the total of current bid/asked prices for all ISC stock prices for the ISCs receiving funding from the escrow account. Further details regarding embodiments of the evaluation procedure are provided in the section "ISC Escrow Funding" hereinbelow.

Subsequently, in step 320, the initial distribution amounts from one or more of the escrows may be adjusted to satisfy certain contractual funding arrangements between the holding company and the ISC 96 that has been evaluated. Note that in general it is contemplated that such additional contractual funding arrangements may be rarely provided. Moreover, in one embodiment, such additional contractual funding arrangements are likely to increase the funding to the ICS that was evaluated. For example, an agreement between the holding company and the ISC 96 may stipulate that for the first year the ISC shall be provided a certain minimum distribution regardless of the ISC's evaluation as per step 316. Accordingly, such additional funding may be provided by one or more of:

(a) From an additional escrow account setup for providing additional contractual funding; and/or (b) Providing any shortfall in funding to the ISC by providing the ISC with a portion of the ISC stock sales deposited into its corresponding one or more escrow accounts from which it receives funding. However, since the initial distributions (as computed in step 316) may vary (upwardly or downwardly) according to corresponding variations (respectively, upwardly or downwardly) in the amount of the ISC stock sales escrow deposits for the ISC, when step 320 no performs any adjustment, the ISC's subsequent distributions from such escrows accounts will be reduced over what they would have been otherwise.

Subsequently, in step 324, the holding company provides the total distribution resulting from steps 316 and 320 to the ISC 96, e.g., via an electronic transfer of funds by the ISC escrow accounts manager 120.

Returning now to step 308, if the present ISC has no competing ISCs for funding distributions, then step 328 is performed wherein the ISC evaluation module 116 may distribute the entire income derived from the escrow account investment to the ISC. However, in one embodiment, since there is no other ISC with which the present ISC is in competition, then the distribution to this ISC may be dependent upon a deviation of its current ISC stock share price form its share price when such share were initially sold. Accordingly, distribution increases and decreases may correspond, respectively, to increases and decreases in the ISC stock share price. This, e.g., a 10% increase in ISC stock share price over the initial share price may correspond to a 10% increase in a distribution to the ISC, and a 10% decrease over the initial share price may correspond to a 10% decrease in a distribution to the ISC. Of course, there may be a cap on the maximum of such a distribution, e.g., dependent upon the amount of income obtained from escrow investments. Note, that there need not be the same increase/decrease in the ISC distribution as there is in the ISC's stock price. Smaller or greater increases/decreases in the ISC distribution are also contemplated.

ISC Escrow Funding.

Such ISC 96 evaluations may be dependent upon various objective and quantifiable factors. However, it may be a preferred objective of the holding company to have such funding distributions dependent, at least in part, on the share price of the ISC stock that is based on the ISC 96. The rationale for this is that the collective perception of the investors 32 (as reflected in the ISC's stock price) should be an important indication as to the success the ISC 96 is having and/or is likely to have. In fact, in some embodiments, the ISC stock price may be substantially or entirely the sole factor in the distribution of funds by the holding company to the ISC 96. However, in other embodiments, additional factors may also be used to evaluate the ISC 96. For example, it may be prudent to rank, rate or compare ISCs that are in similar or related areas of technology or commercialization since this may offer a better indication of how successful ISCs will be than if substantially different types of ISCs are compared against one another for funding. In particular, such segregation or categorization of ISCs not only facilitate comparing similar ISCs to one another for funding purposes, but also assist in dampening large swings in holding company funding reallocations due to ISC share price fluctuations as a result of, e.g., promotions of certain ISCs as having a "new breakthrough technology", or such promotions being based on potentially temporary or tenuous results. Moreover, it is believed that certain investors 32 prefer such segregations or categorizations of ISCs according to various ISC features such as: (i) the one or more types of technologies upon which each ISC is primarily based that is expected to give the ISC a competitive advantage, (ii) metrics related to the size, history, profitability or projections therefor, etc. of the ISCs, (iii) the location of the ISCs (e.g., U.S. based, or European based, etc.). In particular, for ISCs focusing on technologies that have gained a following of interested investors 32 (and potential investors) such categorizations may be especially useful for comparing similar ISCs, and for providing such investors with more confidence that the successful ISCs in areas of their interest will be appropriately funded by the holding company substantially regardless of the success or potential for success of other ISCs based on different technologies. Accordingly, the holding company may have a first escrow account, e.g., for funding ISCs directed to aerospace and rocket based technologies, and a second escrow account for funding ISCs directed to genetic engineering technologies, wherein income derived from the first escrow account (abbreviated as "A&R" below) is provided exclusively to the ISCs directed to aerospace and rocket based technologies, and the income derived from the second escrow account is provided exclusively to the ISCs directed to genetic engineering technologies. Moreover, the ISC evaluations within each escrow funding category may be according to each ISC's ISC stock price per share. Thus, for Sarah's Rocket Company, an ISC 96 having a current share price of $5 per share, and for Rockets To Go, Inc. being another an ISC 96 having a current share price of $10 per share, the corresponding holding company funding obtained from the first escrow account above may be the ratio of the company's share price to the total share prices of all ISCs funded by the escrow account multiplied by the funds to be distributed from the escrow account. Thus, assuming there is only two ISCs to receive funds from the first escrow account, these two ISCs are evaluated so that Sarah's Rocket Company would receive 5/(5+10) or ⅓ of the funds, and Rockets To Go, Inc. would receive 10/(5+10) or ⅔ of the funds. In particular, the values of ⅓ and ⅔ may be considered rankings of these two ISCs. However, it is within the scope of the present disclosure that alternative methods of computing such evaluations and/or other strategies for mitigating potential undesirable consequences from this simple funding allocation strategy. For example, if due to the number of shares (e.g., 1 million shares) issued of the ISC stock for Sarah's Rocket Company that the first escrow account received $5 million (e.g., $5 per share), and similarly due to the number of shares (e.g., 10,000 shares) issued of the ISC stock for Rockets To Go, Inc. that the first escrow account received $100,000 (e.g., $10 per share), then assuming that each company's ISC stock prices stays the same for funding purposes (i.e., $5 per share and $10 per share respectively), Rockets To Go, Inc. derives a substantial funding benefit from the substantial difference in initial funding brought into the first escrow account from the sales of their respective ISC stocks. That is, assuming a 3% distribution on the $5,100,000 in the first escrow account, Sarah's Rocket Company would receive 0.333×0.05×($5,100,000)=$84,915, and Rockets To Go, Inc. would receive 0.667×0.05×($5,100,000)=$170,085. Thus, Rockets To Go, Inc. would receive substantially more on its first escrow funding distribution than it entire ISC stock would be worth.

Accordingly, the present disclosure contemplates mitigating such seeming anomalous distributions of escrow funding by such strategies as: (1) setting a uniform number of ISC stock shares that are available for sale for each ISC, or (2) adjusting such escrow distributions to also account for different ISO stock sales amounts for funding an escrow account. Regarding (2), ISO funding distributions may be adjusted, in one embodiment, according to the total ISC stock sales revenues deposited in a holding company escrow account of each of the ISCs obtaining distributions from the escrow account. For example, each ISC distribution adjustment for an escrow account may be related to a factor indicative of the ratio of the funds deposited in the escrow from sales of the ISC stock for the ISC to the total from all such ISC stock sales that are deposited in the escrow account. For example, instead of the above funding distribution above for Rockets To Go, Inc., that funding distribution would be adjusted by a factor of, e.g., $100,000/$5,100,000 to account for the fractional part of the escrow funding obtained from revenue generated from the sales of its ISC stock. Correspondingly, Sarah's Rocket Company would be adjusted by the factor of $5,000,000/$5,100,000 by the same reasoning. However, the total income obtained is 5%×$5,100,000=$255,000. Accordingly, assuming all of this income (or substantially all) is to be distributed to the two rocket companies, an adjustment factor "Z" can be solved for from the following equation:

$$\begin{aligned}\$255{,}000 &= [\text{Distribution to Rockets To Go, Inc.}] + \\ &\quad [\text{Distribution to Sarah's Rockets}] \\ &= [\text{price ratio of Rockets To Go, Inc.}] \times \\ &\quad [\text{fraction of deposit by Rockets To Go, Inc.} \\ &\quad \text{in } A\ \&R] \times [\text{total distribution}] \times Z + \\ &\quad [\text{price ratio of Sarah's Rockets}] \times \\ &\quad [\text{fraction of deposit by Sarah's Rockets Inc.} \\ &\quad \text{in } A\ \&R] \times [\text{total distribution}] \times Z \\ &= [0.667 \times (\$100{,}000/\$5{,}100{,}000) \times \\ &\quad \$255{,}000 \times Z] + [0.333 \times \\ &\quad (\$5{,}000{,}000/\$5{,}100{,}000) \times \$255{,}000 \times Z]\end{aligned}$$

$$\text{So, } \$255{,}000 = [\$3{,}335 \times Z] + [\$83{,}250 \times Z]$$

So, Z=~2.945, and accordingly, the distribution to Rockets To Go, Inc. is $9,821.85, and the distribution to Sarah's Rocket Company is $245,178.15.

Note that the factor "price ratio of Rockets To Go, Inc." above multiplied by any (or all) of the multiplicative factors for determining for determining the distribution to Rockets To Go, Inc. from A&R may be considered an evaluation of Rockets To Go, Inc. Similarly, the factor "price ratio of Sarah's Rockets" above multiplied by any (or all) of the multiplicative factors for determining for determining the distribution to Sarah's Rockets from A&R may be considered an evaluation of Sarah's Rockets.

Further, note that the above computations clearly extend to any number of ISCs whose funding distributions are from a single escrow account.

As discussed regarding step 216 above, an ISC's periodic funding also may be from a plurality of escrow accounts wherein weightings may be assigned to the ISC such that there is a weighting for to each of the plurality escrow accounts from which the ISC receives a distribution. In particular, each such weighting may be considered a measurement of how relevant the category of ISCs for the escrow to which the weighting corresponds. Thus, when a particular ISC 96 is classified into plurality categories for receiving escrow distributions, the computations for escrow distribution may be a combination of the computations described regarding step 216, and the computations for ISC evaluations described above.

To illustrate how an ISC evaluation may be computed wherein the ISC is funded via multiple escrow accounts, assume that company B is also assigned, along with Sarah's Rocket Company and Rockets To Go, Inc., to the same aerospace and rocket based technology category for receiving funding from the same escrow account for this category. Further assume company B's share price at the time of evaluation is $3/share on 100,000 shares that originally sold at $2 per share wherein 40% went into the aerospace and rocket based technology escrow account ("A&R). Additionally, assume the two other ISCs in the aerospace and rocket based technology category have same current share prices as when originally sold, i.e., $5 per share and $10 per share. Further, assume that 60% of the sale of ISC stock for company B is deposited in the escrow account corresponding to the category of environmental cleanup (for convenience the corresponding escrow account abbreviated as "EC" below), wherein there are two other ISCs in this category (company C and company D) having respective initial sales share prices of $4 per share on 10,000 outstanding shares, all of which are assigned to an environmental cleanup category, and $3 per share on 20,000 outstanding shares, all of which are assigned to the environmental cleanup category. Also, assume the current share prices for companies C and D, respectively, are $9 per share and $7 per share. Since 40% of B's stocks sale revenue goes into A&R, this corresponds to 40% of B's 100,000 outstanding shares (i.e., 40,000) being wholly invested in A&R, and the other 60% (i.e., 60,000 shares) being wholly invested in EC. Accordingly, with this apportionment determined first, the evaluation computations illustrated above may be followed. However, it is also worth noting that for illustrative purposes only it is also assumed here that each of A&R and EC only receive revenues from the initial sales of ISC stock. In operation, the holding company may provide such escrow accounts with deposits from other sources such as commissions from investor 32 ISC stock transactions following initial investor stock purchases; i.e., subsequent ISC stock exchanges, sales, and purchases. Thus, given these assumptions, the funding for company B may be computed (e.g., by the ISC evaluation module 116) according to the following equations:

Funding for $B$ = [funding from $A\ \&R$ according to 40,000 of $B's$ shares] + [funding from $EC$ according to 60,000 of $B's$ share]

= [(ratio of $B's$ current stock price to total $ISC$ current stock prices for $A\ \&R) \times$ (total amount to be distributed from $A\ \&R$ to $ISCs) \times (B's$ fraction of the deposit to $A\ \&R)] +$

[(ratio of $B's$ current stock price to total $ISC$ current stock prices for $EC) \times$ (total amount to be distributed from $EC$ to $ISCs) \times$ (adjustment factor $Z_2$ for $EC$)

($B's$ fraction of the deposit to to $EC$)]

= [(3/(3 + 5 + 10) × (0.05 × $5,180,000) ×

$Z_1$ × (40,000 × $3/share)/$5,180,000] +

[(3/(3 + 9 + 7) × (0.05 × $160,000) × $Z_2$ ×

(60,000 × $3/share)/$160,000]

= [$1,000.20 × $Z_1$] + [$1,421.07 × $Z_2$].

Accordingly, the adjustment factors $Z_1$ and $Z_2$ need to be computed as follows assuming a 5% distribution.

For $Z_1$:

5% × [total $A\ \&R$ distribution] = 0.05 × $5,180,000 = $259,000

= [Distribution to $B$] +
[Distribution to Sarah's Rockets] +
[Distribution to Rockets To Go]

= [($3/(3 + 5 + 10)) × ($259,000) × $Z_1$ ×
($2 × 40,000)/$5,180,000] +

[($5/(3 + 5 + 10) × ($259,000) × $Z_1$ ×
$5,000,000/$5,180,000] +

[($10/(3 + 5 + 10) × ($259,000) × $Z_1$ ×
$100,000/$5,180,000]

= [$666.80 × $Z_1$] + [$69,450 × $Z_1$] +
[$2,778 × $Z_1$]

= $72,894.80 × $Z_1$.

So, $Z_1$ = $259,000/($72,894.80) = ~3.5531

So, the distribution to B from A&R is:

0.1667×$259,000×3.5531×$120,000/$5,180,000=$3,553.78.

For $Z_2$:

$$5\% \times [\text{total EC distribution}] = 0.05 \times \$220{,}000 = \$11{,}000$$

$$= [\text{Distribution to } B] + [\text{Distribution to } C] + [\text{Distribution to } D]$$

$$= [(\$3/(3+9+7)) \times (\$11{,}000) \times Z_2 \times (\$2 \times 60{,}000)/\$220{,}000] +$$

$$[(\$5/(3+9+7)) \times (\$11{,}000) \times Z_2 \times (\$4 \times 10{,}000)/\$220{,}000] +$$

$$[(\$10/(3+9+7)) \times (\$11{,}000) \times Z_2 \times (\$3 \times 20{,}000)/\$220{,}000]$$

$$= [\$947.38 \times Z_2] + [\$526.40 \times Z_2] + [\$1{,}578.90 \times Z_2]$$

$$= \$3{,}052.68 \times Z_2.$$

So, $Z_2 = \$11{,}000/(\$3{,}052.68) = \sim 2.621$

So, the distribution to B from EC is:

[0.157897×$11,000×2.621×$120,000=$2,483.09.

Thus, the total distribution to company B is $3,553.78+$2,483.09=$6,036.87.

As one skilled in the art will recognize, computations corresponding to those above for company B can be performed by the ISC evaluation module 120 for any ISC 96, and such computations compute funding distributions from various escrow accounts in manner that is proportional to the corresponding ISC stock sales revenue deposited in each escrow account. Moreover, it should be readily apparent that computations such as those above extend to multiple ISC stock offering for the same ISC 96. For example, if company B above had another subsequent ISC stock issuance, wherein another 80,000 shares were sold at $3.50 per share, then the above calculations would be as follows (assuming the same 40% 60% split between the escrow accounts, A&R and EC, and assuming the same current ISC stock prices as stated above):

Total distribution for A&R is: 0.05×($5,180,000+(0.4×80,000×$3.50))=$264,600.
Total distribution for EC is: 0.05×($160,000+(0.6×80,000×$3.50))=$328,000

Funding for $B$=[(3/(3+5+10))×$264,600×(new$Z_1$)×(40,000+(0.4×80,000)×$3/share)]+[(3/(3+9+7)×$328,000×(new$Z_2$)×(60,000+(0.6×80,000×$3/share)].

However, to complete this new calculation for the funding of B, the new adjustment factors "new$Z_1$" and "new$Z_2$" would need to be computed in a manner corresponding to the respective computations for "$Z_1$" and "$Z_2$" above.

It is important to note that other methods for computing ISC distribution evaluations are also within the scope of the present disclosure. In particular, for computing a funding distribution for a given ISC 96 from a particular escrow account, other equations (and the machine computational implementations therefor) that incentivize the ISCs increase their corresponding ISC stock price since it is an important aspect of the present disclosure that escrow distributions to ISCs may be determined using at least one factor that tracks the rise and fall of their corresponding ISC stock share prices. For example, an escrow distribution to an ISC 96 may be such that it is, e.g.:

(a) Dependent upon a ratio of the given ISC's current share price to the total of the share prices of all ISCs funded by the particular escrow account (e.g., linearly dependent on the ratio as in the examples above, polynomially dependent wherein, e.g., the exponent on the ratio may be between 1 and 2, or dependent upon a sigmoid function of the ratio over the range of the current share prices);

(b) Dependent upon the amount of escrow funds to be distributed;

(c) Dependent upon the total deposit(s) into the particular escrow account from the sale of ISC stock for the given ISC 96; and (d) Dependent upon an adjustment factor that is, in turn, dependent upon, e.g., one or more of:
  (i) The ratio of (a) immediately above for one or more of the ISCs whose corresponding ISC stock sales is deposited into the particular escrow account;
  (ii) The total amount to be distributed from the particular escrow account; and
  (iii) For each ISC 96 funded by the particular escrow account, the total amount deposited by the ISC into this escrow account.

Additionally, note that although the use of share prices as demonstrated in the examples above for determining share price tracking factors may be preferred, additional methods for performing such tracking is also with the scope of the present disclosure. In particular, instead of such tracking factors (e.g., the ratios determined according to (a) immediately above) being based on current share prices, average of share prices over, e.g., a most recent time period such as a month may be used to replace each of the current share prices used in the ratio computations (a) immediately above. Alternatively/additionally, median share prices, or a technique for predicting share prices according to a price trend analysis may be used over such a recent time period.

Note that determination of which escrow accounts should receive what percentage of deposits from sales of ISC stock for a given ISC 96 may be determined according one or more of the following:

(a) The important commercial products or services sold (or proposed to be sold) by the ISC;

(b) The commercial applications of the ISC's products or services; and (c) One or more ISC generic characteristics of ISCs such as size, length of time in business, indebtedness, gross revenue, etc.

Additional Remarks.

In one embodiment, an ISC 96 also agrees to pay the holding company a dividend on future profits (as determined by generally accepted accounting principles). Note that such dividend payments do not require the ISC to make an IPO since such dividends are paid to the holding company which is a legally "accredited" investor. Accordingly, the holding company can readily pass on such dividend payments to the investors 32 that own ISC stock for the ISC 96.

The holding company may also establish and provide a futures market in the ISC stocks, wherein calls and puts are available to investors 32.

Holding company fees received for the buying, selling or exchanging of ISC stocks (or options thereon) may also be used by the holding company to fund the escrow accounts. In particular, a $10 fee charged to sell ISC stock, X, may be distributed among the escrow accounts from which X receives distributions, wherein each of these escrow accounts, EA, receives a portion of such a fee according to the proportion of X's total escrowed funds (in all escrow accounts) that is deposited in EA.

It is preferred that the holding company issue ISC stock for at least 30 or more distinct ISCs 96, wherein the holding company is providing funding distributions in a same time period (e.g., a year) to each of the 30 or more ISCs, as well as allowing investors 32 buy, sell or exchange their corresponding ISC stocks. Accordingly, the steps of the flowcharts of FIGS. 2 and 3 are preferably repeated for a plurality of different investment seeking companies.

Additionally, the holding company may agree with a given ISC 96 to provide a future "second round" or "alternative round" of financing to the ISC. In the second/alternative round, the holding company may sell publicly additional ISC stock for the given ISC 96, wherein this ISC provides additional private equity to the holding company as the basis for the second/alternative round of this ISC stock. The receipts from the sale of this second/alternative round of ISC stock may be substantially entirely provided to the given ISC 96 as a lump sum payment. Typically, an ISC 96 will receive appropriate benefit from this second/alternative round when previously sold ISC stock associated with the given ISC is trading at a comparatively high price.

So, by way of example, according to one embodiment, the given ISC 96 sells a percentage (for example, 10% to 25%) of its equity to the holding company for, say, one dollar. In exchange, the holding company agrees to provide services as described in the Summary section hereinabove such as to issue holding company stock (i.e., ISC stock) that is based substantially on the assets and achievements of the given ISC. In particular, this ISC stock is based on a somewhat lesser percentage (e.g., 8% to 20%) of the given ISC than what was sold to the holding company. The proceeds of the ISC stock sale may be provided to one or more escrow accounts for providing periodic distributions the given ISC, or in a second/alternative round of ISC financing, the proceeds from the sale may be substantially entirely provided to the given ISC.

In one embodiment, a portion of the proceeds raised from ISC stock sales may be provided to an escrow account from which all ISCs 96 receive a distribution according to, e.g., the funding distribution procedures described hereinabove, e.g., iii the section "ISC Escrow Funding". Accordingly, the income generated for this "common" escrow account may be used to meet additional holding company obligations to fund an ISC 96 as per step 320 of FIG. 3. In one embodiment, between 20% and 50% of the proceeds from various ISC stock sales may be deposited in this common escrow account.

In one embodiment, not all income derived from investing escrow account funds may be distributed to the ISCs 96 being funded by the escrow account. Instead, such non-distributed income may be put back into the escrow account to grow this account, and thus provide larger ISC distributions in the future.

The methodology disclosed herein for funding privately held investment seeking companies lawfully compiles with "sunshine sales" laws, because it involves sales of shares of a company (the holding company) with actual hard assets, e.g., the escrow accounts.

It is within the scope of the present disclosure to also include computational machinery readable media such as magnetic tapes, optical readable disks, Investors of comparatively modest means are able to participate, albeit indirectly, in the financing of promising start-up companies that become ISCs funded by the holding company. Note that directly investing in start-ups by investors of modest means generally is prohibited under by applicable U.S. securities laws. Under the presently disclosed process, however, ISC stock for each ISC 96 can be bought and sold for relatively small amounts at will.

The foregoing discussion of the financing method for companies seeking investment, and the corresponding computational system representatively embodied in the description of the holding company above, have been presented for purposes of illustration and description to one of ordinary skill in the art. Such illustration and description is not intended to limit the invention(s) disclosed herein to the specific form and precise content disclosed herein. Consequently, variation and modification commiserate with the above teachings, within the skill and knowledge of those of skill in the relevant art, are within the scope of the present disclosure. The embodiments described herein are further intended to explain the best mode presently known of practicing the invention recited in the claims hereinbelow, and to enable others skilled in the art to make and use each such claimed invention as may be provided with the various modifications required by their particular application or uses of the present disclosure.

What is claimed is:

1. A method for managing investments for a plurality of private enterprises, comprising:

establishing a managing enterprise independent of the plurality of private enterprises;

obtaining equity in each of the plurality of enterprises by the managing enterprise;

entering into arrangements between the managing enterprise and each of the plurality of private enterprises for funding of the private enterprises through investments;

communicating between investors and/or the managing enterprise and/or the plurality of private enterprises by a network interface;

collecting, for each of the plurality of enterprises, money and/or equity for the purpose of making investments through the managing enterprise;

investing, for each of the enterprises, proceeds from the collecting of money and/or equity for each of the plurality of enterprises by the managing enterprise;

receiving a return on the invested proceeds for at least one of the plurality of private enterprises;

evaluating, using specifically configured computational machinery, each of the at least one private enterprises which received a return for determining a portion of the return to provide to each of the at least one private enterprises; and providing each of the plurality of private enterprises receiving a return with their corresponding portions of the return;

wherein the steps are performed using a computational machine specifically configured to assist in managing the invested proceeds and the communication between the managing enterprise and the plurality of private enterprises;

wherein the step of evaluating includes comparing, using specifically configured computational machinery, the return to the at least one private enterprises to the return to at least one other private enterprise receiving a return on the invested proceeds;

receiving by each of the plurality of enterprises a return corresponding to their respective portions of the return;

wherein an investment return is received on invested proceeds from sales of shares of each of a plurality of classes of stock in a managing enterprise;

wherein for each of the classes of stock, the shares therefore are based on at least a portion of the managing enterprise's equity in a corresponding one of a plurality of enterprises, each of the enterprises being distinct from the managing enterprise;

communicating, with investors, via a network site on the network, to buy or sell shares of the managing enterprise stock in the plurality of classes comprising:

determining a funding distribution to each of the plurality of private enterprises, wherein the evaluator uses a share price of the corresponding shares based on the equity in a first of the plurality of private enterprises to determine a funding distribution to at least a first enterprise, and evaluator uses a share price of the corresponding public shares based on the equity in at least second enterprise to determine a funding distribution to the second enterprise;

wherein the evaluator determines the funding distribution to the at least a first enterprise according to a computational process that relates the funding distribution for the first enterprise to the share price of the corresponding public shares based on the equity in the first enterprise;

wherein the evaluator determines the funding distribution to the at least second enterprise in a manner that varies inversely with the funding distribution to the first enterprise;

wherein the evaluator is in operative communication with the network site or data storage accessible by the network site for presenting information indicative of the funding distributions to at least one of: (i) one of the investors and the first enterprise.

2. The method of claim 1, wherein the managing enterprise obtains private equity in each of the plurality of private enterprises in an amount not exceeding 20% of the total equity for any one of the plurality of enterprises;

wherein for each of the plurality of private enterprises, the managing enterprise issues corresponding public shares of a class of managing enterprise stock, wherein the corresponding managing enterprise shares for the class are based on at least a portion of the managing enterprise's equity in the private enterprise;

wherein for each of the private enterprises, the managing enterprise receives a return on invested proceeds from a sale of the corresponding managing enterprise class of public shares based on the equity in the private enterprise; comprising:

performing, using specifically configured computational machinery, at least the steps of evaluating and determining following;

evaluating each of the first and the second private enterprises for obtaining, respective first and second data related to a corresponding portion of the return to be provided to each of the first and second private enterprises, wherein the evaluation of the first private enterprise is dependent upon a first value of the corresponding public shares based on the equity in the first private enterprise, and wherein the evaluation of a second private enterprise of the plurality of private enterprises is dependent upon a second value of the corresponding public shares based on the equity in the second private enterprise; and determining, dependent upon a result from the evaluating step, a corresponding portion of the return to be provided to each of the first and second private enterprises; and providing each of the first and second private enterprises with their corresponding portions of the return.

3. The method of claim 2, wherein the class of managing enterprise stock for the first private enterprise is purchasable by one or more investors separately from a purchase of the class of managing enterprise stock for the second private enterprise, and the class of managing enterprise stock for the second private enterprise is purchasable by one or more investors separately from a purchase of the class of managing enterprise stock for the first private enterprise.

4. The method of claim 2, further including a step of determining the corresponding portion of the return to be provided to the first private enterprise by modifying an initially determined first distribution amount to conform to one or more predetermined funding criteria.

5. The method of claim 1, wherein the equity obtained by the managing enterprise in each of the plurality of private enterprises is private equity.

6. The method of claim 1 wherein the managing enterprise is privately held.

7. The method of claim 1, wherein the arrangements between the managing enterprise and at least one of the plurality of private enterprises is a private contract.

8. The method of claim 1, further including a step of combining the proceeds from the investment of money and/or equity from at least a first private enterprise among the plurality of private enterprises with the proceeds from the investment of money and/or equity from at least a second private enterprise among the plurality of private enterprises, wherein the step of investing includes further investing the combined proceeds.

9. The method of claim 1, further including a step of collecting a monetary fee from one or more of the plurality of private enterprises by the managing enterprise prior to the step of investing proceeds.

10. The method of claim 1, wherein the step of evaluating includes determining the equity in the first enterprise dependent upon one of a bid and an asked for value.

11. The method of claim 1, wherein the step of evaluating includes determining the portion of the return for the at least one private enterprise in a manner that considers the value of the equity held by the managing enterprise in at least one private enterprise.

12. The method of claim 1, further including:
receiving a second return on the invested proceeds for at least one first enterprise and one second enterprise of the plurality of private enterprises;

evaluating, by specifically configured computational machinery, each of the at least one first and one second private enterprises for determining a corresponding portion of the second return to be provided to each the at least one first and second private enterprises, wherein an evaluation of the at least one first private enterprise in this second evaluating step is dependent upon a value of the equity held by the managing enterprise in the at least one first private enterprise, and wherein an evaluation of the at least one second private enterprise in this second evaluating step is dependent upon a value of the equity held by the managing enterprise in the at least one second private enterprise; and providing each of the at least one first and second private enterprises with their corresponding portions of the return.

13. The method of claim 12, wherein the second evaluating step is not dependent on the corresponding portion of the return provided to at least one first private enterprise.

14. The method of claim 1 further including repeating the steps of investing, receiving, evaluating, and providing a return, wherein in each subsequent repetition, performance of a corresponding instance of the evaluating step determines the value of the equity held by the managing enterprise in each of the plurality of private enterprises at a later time than each previous step of evaluating.

15. The method of claim 1 further including a step of issuing, by the managing enterprise, shares in at least one of the plurality of private enterprises.

16. The method of claim 15, wherein a share price of the corresponding shares for each of the at least one of the plurality of private companies is based on the equity held by the managing enterprise in least one of the plurality of private enterprises.

17. The method of claim 16 further including the step of receiving a disbursement from the at least one first private enterprise, and distributing the disbursement to one or more individual share holders owning the shares based on the equity held by the one or more individual share holders in the at least one first private enterprise.

18. The method of claim 17, wherein one or more of the steps of investing, receiving and providing a return are performed by computational machinery.

* * * * *